(12) United States Patent
Compton

(10) Patent No.: US 11,870,790 B2
(45) Date of Patent: *Jan. 9, 2024

(54) NETWORK TRAFFIC DETECTION WITH MITIGATION OF ANOMALOUS TRAFFIC AND/OR CLASSIFICATION OF TRAFFIC

(71) Applicant: Charter Communications Operating, LLC, St. Louis, MO (US)

(72) Inventor: Richard A Compton, Highlands Ranch, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/074,499

(22) Filed: Dec. 4, 2022

(65) Prior Publication Data

US 2023/0094900 A1  Mar. 30, 2023

Related U.S. Application Data

(63) Continuation of application No. 16/428,782, filed on May 31, 2019, now Pat. No. 11,522,874.

(51) Int. Cl.
*H04L 9/40* (2022.01)
*H04L 45/00* (2022.01)
(Continued)

(52) U.S. Cl.
CPC ........ *H04L 63/1416* (2013.01); *H04L 43/028* (2013.01); *H04L 45/70* (2013.01);
(Continued)

(58) Field of Classification Search
CPC ............ H04L 63/1416; H04L 63/1425; H04L 63/1441; H04L 63/1408; H04L 67/04;
(Continued)

(56) References Cited

U.S. PATENT DOCUMENTS 7,433,881 B1  10/2008  Hill
7,478,327 B1   1/2009  Reid
(Continued)

OTHER PUBLICATIONS

"Defeating DDoS Attacks," White Paper, Cisco Systems, Inc., 2004, pp. 1-11.
(Continued)

*Primary Examiner* — Kyung H Shin
(74) *Attorney, Agent, or Firm* — Otterstedt & Kammer PLLC

(57) ABSTRACT

Methods, systems, and apparatus for detecting and mitigating anomalous network traffic. With at least one processor in a network, information regarding network traffic flows is obtained and a classification model is generated based on the obtained information, the classification model comprising one or more classification rules for classifying network traffic as normal or anomalous. With the at least one processor in the network, the network traffic is classified as anomalous or normal based on the generated classification model and at least one mitigation action is initiated based on the network traffic being classified as anomalous.

4 Claims, 13 Drawing Sheets

(51) Int. Cl.
*H04L 43/028* (2022.01)
*H04L 61/4511* (2022.01)

(52) U.S. Cl.
CPC .......... *H04L 63/10* (2013.01); *H04L 63/1408* (2013.01); *H04L 63/1425* (2013.01); *H04L 63/20* (2013.01); *H04L 61/4511* (2022.05); *H04L 63/145* (2013.01); *H04L 63/1458* (2013.01)

(58) Field of Classification Search
CPC ..... H04L 67/125; H04L 67/53; H04L 67/303; H04L 67/306; H04L 67/30; H04L 67/131; H04L 67/564; H04L 67/02; H04L 67/56; H04L 67/10; H04L 63/1458; G06N 20/00
See application file for complete search history.

(56) References Cited

U.S. PATENT DOCUMENTS

| | | | |
|---|---|---|---|
| 7,788,718 | B1 | 8/2010 | Fei et al. |
| 7,792,963 | B2 | 9/2010 | Gould |
| 9,009,828 | B1 | 4/2015 | Ramsey |
| 10,320,810 | B1 * | 6/2019 | Xu ................ H04L 63/1408 |
| 10,320,813 | B1 * | 6/2019 | Ahmed ........... H04L 63/1416 |
| 11,032,315 | B2 | 6/2021 | Compton |
| 11,093,641 | B1 | 8/2021 | Whalen |
| 11,522,874 | B2 | 12/2022 | Compton |
| 2003/0056217 | A1 | 3/2003 | Brooks |
| 2003/0145232 | A1 | 7/2003 | Poletto et al. |
| 2006/0130107 | A1 | 6/2006 | Gonder et al. |
| 2006/0272018 | A1 | 11/2006 | Fouant |
| 2007/0217436 | A1 | 9/2007 | Markley |
| 2009/0248794 | A1 | 10/2009 | Helms |
| 2010/0313236 | A1 | 12/2010 | Straub |
| 2011/0055921 | A1 * | 3/2011 | Narayanaswamy ........ H04L 63/1458 726/22 |
| 2011/0191847 | A1 | 8/2011 | Davis et al. |
| 2015/0312273 | A1 | 10/2015 | Pappu et al. |
| 2016/0036837 | A1 | 2/2016 | Jain et al. |
| 2017/0048815 | A1 | 2/2017 | Clarke |
| 2017/0279835 | A1 | 9/2017 | Di Pietro et al. |
| 2018/0152466 | A1 | 5/2018 | Sartran et al. |
| 2020/0236131 | A1 | 7/2020 | Vejman |
| 2021/0297446 | A1 | 9/2021 | Compton |

OTHER PUBLICATIONS

Linda Musthaler, "Best Practices to Mitigate DDoS Attacks," Network World, IDG Communications, Inc., Jan. 2013, pp. 1-4.
Use of machine learning for anomaly detection in netflow data | Eraclitux' . . . https://eraclitux.com/posts/use-of-machine-learning-for-anomaly-detectio . . . , Posted: Nov. 3, 2015, pp. 1-9.

* cited by examiner

NETWORK TRAFFIC DETECTION WITH MITIGATION OF ANOMALOUS TRAFFIC AND/OR CLASSIFICATION OF TRAFFIC

CROSS-REFERENCE TO RELATED APPLICATION

This application is a continuation of co-assigned U.S. patent application Ser. No. 16/428,782 of inventor Richard A. Compton, and claims the benefit thereof, said application Ser. No. 16/428,782 having been filed on 31 May 2019, and entitled "NETWORK TRAFFIC DETECTION WITH MITIGATION OF ANOMALOUS TRAFFIC AND/OR CLASSIFICATION OF TRAFFIC." The complete disclosure of the aforesaid application number 16428782 is expressly incorporated herein by reference in its entirety for all purposes.

FIELD OF THE INVENTION

The present invention relates generally to the electrical, electronic, and computer arts, and more particularly relates to detecting, classifying, and mitigating network traffic.

BACKGROUND OF THE INVENTION

Historically, the cable network was predominantly a vehicle for delivering entertainment. With the advent of the Internet and the rise in demand for broadband two-way access, the cable industry began to seek new ways of utilizing its existing plant. Pure coaxial ("coax") cable networks were replaced with hybrid fiber/coax networks (HFCs) using optical fiber from the head end to the demarcation with the subscriber coax (usually at a fiber node). Currently, a content-based network, a non-limiting example of which is a cable television network, may afford access to a variety of services besides television, for example, broadband Internet access, telephone service, and the like. There are also fiber networks for fiber to the home (FTTH) deployments (also known as fiber to the premises or FTTP), where the CPE is a Service ONU (S-ONU; ONU=optical network unit).

One significant issue for a cable operator desiring to provide digital service is the configuration of its network. Designed for one-way delivery of broadcast signals, the existing cable network topology was optimized for downstream only (i.e., towards the subscriber) service. New equipment had to be added to the network to provide two-way communication. To reduce the cost of this equipment and to simplify the upgrade of the broadcast cable for two-way digital traffic, standards were developed for a variety of new cable-based services. The first of these standards, the Data Over Cable System Interface Standard (DOCSIS® standard), was released in 1998. DOCSIS® establishes standards for cable modems and supporting equipment. DOCSIS® (Data Over Cable Service Interface Specification) is a registered mark of Cable Television Laboratories, Inc., 400 Centennial Parkway Louisville CO 80027, USA, and may be referred to at some points herein in capital letters, without the ® symbol, for convenience.

There are many types of IP networks besides cable networks. Other wired IP networks include, for example, digital subscriber line (DSL), fiber to the home, fiber to the curb, and so on. Wireless IP networks include Wi-Fi, wireless ISP (Internet Service Provider), WiMAX, satellite internet, and mobile broadband.

Provisioning, within a broadband network, includes the process of ensuring that customer premises equipment (CPE) such as cable modems, digital subscriber line (DSL) modems, and the like are properly configured, authenticated, and successfully come online. Parental control devices can be, for example, configured to block access to certain content via the broadband network.

A variety of devices, such as laptop computers, smartphones, Internet of Things (IoT) devices (including web cameras and thermostats), and the like, can access networks, such as the Internet, via the CPE. These devices are, however, susceptible to various malicious infections and viruses, or can be used to conduct malicious activities. For example, botnets are known to infect IoT devices. (Sixty percent of bots are estimated to infect IoT devices and often prove difficult to detect and mitigate.) The botnets, through the use of a bot on the infected device, may generate malicious network traffic that can cause, for example, a denial of service attack. The malicious network traffic may, for example, originate from a host computer or originate on the device of a customer of an internet service provider and flow to the Internet via a cable modem. Such botnets can infect the devices of other customers with bots, scan the internet and the ISP network for vulnerabilities, throttle customer traffic (potentially leading to customer dissatisfaction), cause data exfiltration, propagate spam, slow down the processing/compute speed of the infected device, completely shut down the infected device, encrypt the customer data and ask for a ransom in exchange for decryption (ransomware), and the like.

SUMMARY OF THE INVENTION

Techniques are provided for network traffic detection with mitigation of anomalous traffic and/or classification of traffic.

In one aspect, an exemplary method includes, with at least one processor in a network, obtaining information regarding network traffic flows; with the at least one processor in the network, generating a classification model based on the obtained information, the classification model comprising one or more classification rules for classifying network traffic as normal or anomalous; with the at least one processor in the network, classifying the network traffic as anomalous or normal based on the generated classification model; and with the at least one processor in the network, initiating at least one mitigation action based on the network traffic being classified as anomalous.

In one aspect, a non-transitory computer readable medium comprises computer executable instructions which when executed by a computer cause the computer to perform a method comprising operations of: with at least one processor in a network, obtaining information regarding network traffic flows; with the at least one processor in the network, generating a classification model based on the obtained information, the classification model comprising one or more classification rules for classifying network traffic as normal or anomalous; with the at least one processor in the network, classifying the network traffic as anomalous or normal based on the generated classification model; and with the at least one processor in the network, initiating at least one mitigation action based on the network traffic being classified as anomalous.

In one aspect, an apparatus comprises a memory; and at least one processor, coupled to said memory, and operative to perform operations comprising: with at least one processor in a network, obtaining information regarding network traffic flows; with the at least one processor in the network, generating a classification model based on the obtained information, the classification model comprising one or more classification rules for classifying network traffic as normal or anomalous; with the at least one processor in the network, classifying the network traffic as anomalous or normal based on the generated classification model; and with the at least one processor in the network, initiating at least one mitigation action based on the network traffic being classified as anomalous.

In one aspect, an exemplary method for classifying network traffic comprises the operations of: with at least one processor in a network, obtaining information regarding network traffic flows; with the at least one processor in the network, classifying the network traffic based on one or more classification rules and the obtained information; and with the at least one processor in the network, initiating at least one notification based on the classification of the network traffic.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of an article of manufacture including a machine readable medium that contains one or more programs which when executed implement one or more method steps set forth herein; that is to say, a computer program product including a tangible computer readable recordable storage medium (or multiple such media) with computer usable program code for performing the method steps indicated. Furthermore, one or more embodiments of the invention or elements thereof can be implemented in the form of an apparatus (such as a rules engine and the like) including a memory and at least one processor that is coupled to the memory and operative to perform, or facilitate performance of, exemplary method steps. Yet further, in another aspect, one or more embodiments of the invention or elements thereof can be implemented in the form of means for carrying out one or more of the method steps described herein; the means can include (i) specialized hardware module(s), (ii) software and/or firmware module(s) stored in a tangible computer-readable recordable storage medium (or multiple such media) and implemented on a hardware processor, or (iii) a combination of (i) and (ii); any of (i)-(iii) implement the specific techniques set forth herein. The means do not include a transmission medium per se or a disembodied signal per se.

Techniques of the present invention can provide substantial beneficial technical effects. For example, one or more embodiments provide one or more of:
  detection, classification, and notification of network traffic;
  detection, classification, notification, and mitigation of anomalous network traffic;
  training of machine learning systems to detect and mitigate anomalous traffic flows; and/or
  a reduction in the percentage of traffic subjected to deep packet inspection (DPI) and a reduction in the required DPI processing capacities.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
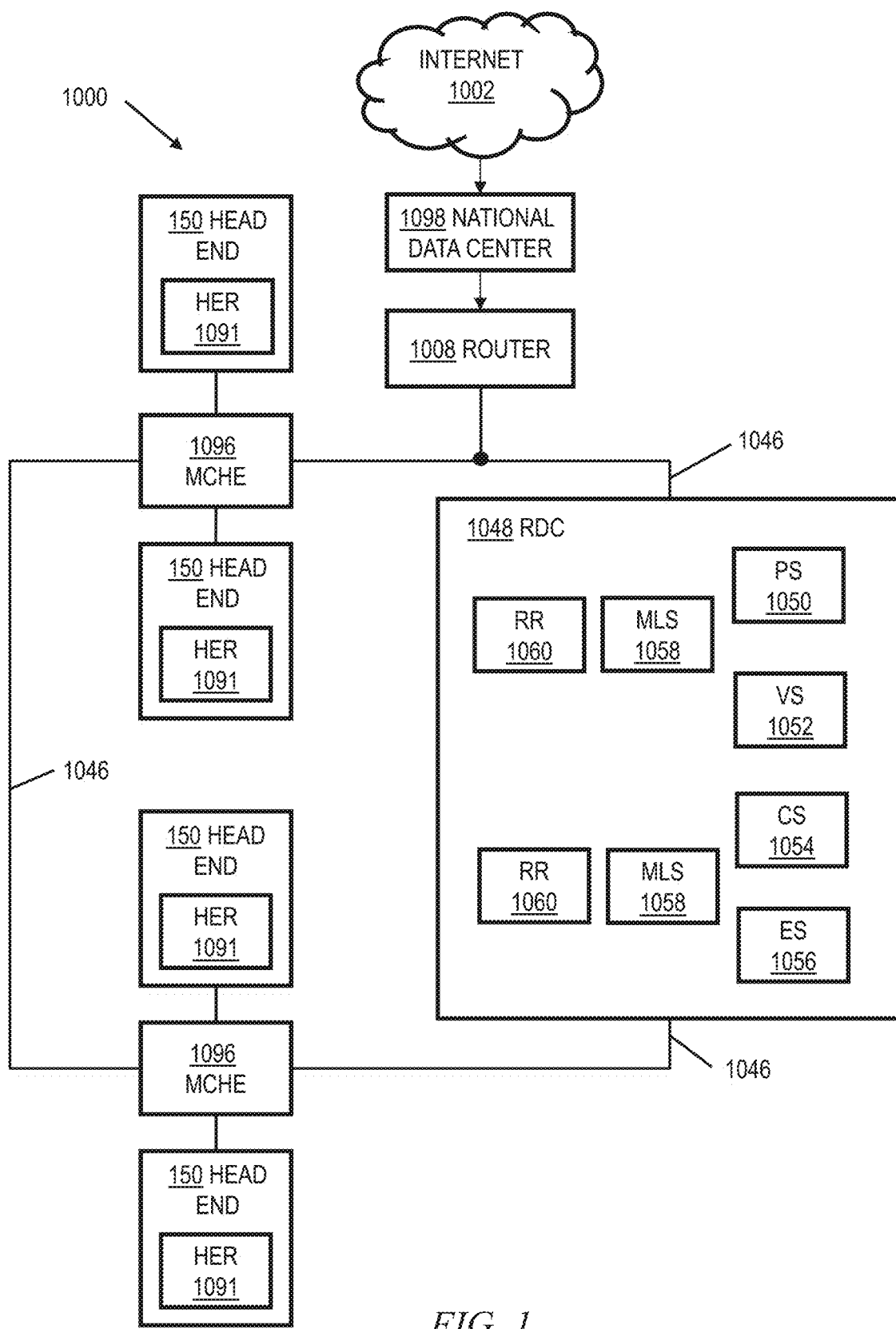
FIG. 1 is a block diagram of an exemplary embodiment of a system, within which one or more aspects of the invention can be implemented.

As noted, IP-based data services may be provided over a variety of networks. Purely by way of example and not limitation, some embodiments will be shown in the context of a cable multi-service operator (MSO) providing data services as well as entertainment services. FIG. 1 shows an exemplary system 1000, according to an aspect of the invention. System 1000 includes a regional data center (RDC) 1048 coupled to several Market Center Head Ends (MCHEs) 1096; each MCHE 1096 is in turn coupled to one or more divisions, represented by division head ends 150. In a non-limiting example, the MCHEs are coupled to the RDC 1048 via a network of switches and routers. One suitable example of network 1046 is a dense wavelength division multiplex (DWDM) network. The MCHEs can be employed, for example, for a large metropolitan area. In addition, the MCHE is connected to localized HEs 150 via high-speed routers 1091 ("HER"=head end router) and a suitable network, which could, for example, also utilize DWDM technology. Elements 1048, 1096 on network 1046 may be operated, for example, by or on behalf of a cable MSO, and may be interconnected with a global system of interconnected computer networks that use the standardized Internet Protocol Suite (TCP/IP) (transfer control protocol/Internet protocol), commonly called the Internet 1002; for example, via router 1008. In one or more non-limiting exemplary embodiments, router 1008 is a point-of-presence ("POP") router; for example, of the kind available from Juniper Networks, Inc., Sunnyvale, California, USA.

Head end routers 1091 are omitted from figures below to avoid clutter, and not all switches, routers, etc. associated with network 1046 are shown, also to avoid clutter.

RDC 1048 may include one or more provisioning servers (PS) 1050, one or more Video Servers (VS) 1052, one or more content servers (CS) 1054, and one or more e-mail servers (ES) 1056. The same may be interconnected to one or more RDC routers (RR) 1060 by one or more multi-layer switches (MLS) 1058. RDC routers 1060 interconnect with network 1046.

A national data center (NDC) 1098 is provided in some instances; for example, between router 1008 and Internet 1002. In one or more embodiments, such an NDC may consolidate at least some functionality from head ends (local and/or market center) and/or regional data centers. For example, such an NDC might include one or more VOD servers; switched digital video (SDV) functionality; gateways to obtain content (e.g., program content) from various sources including cable feeds and/or satellite; and so on.

In some cases, there may be more than one national data center 1098 (e.g., two) to provide redundancy. There can be multiple regional data centers 1048. In some cases, MCHEs could be omitted and the local head ends 150 coupled directly to the RDC 1048.

Figure 2:
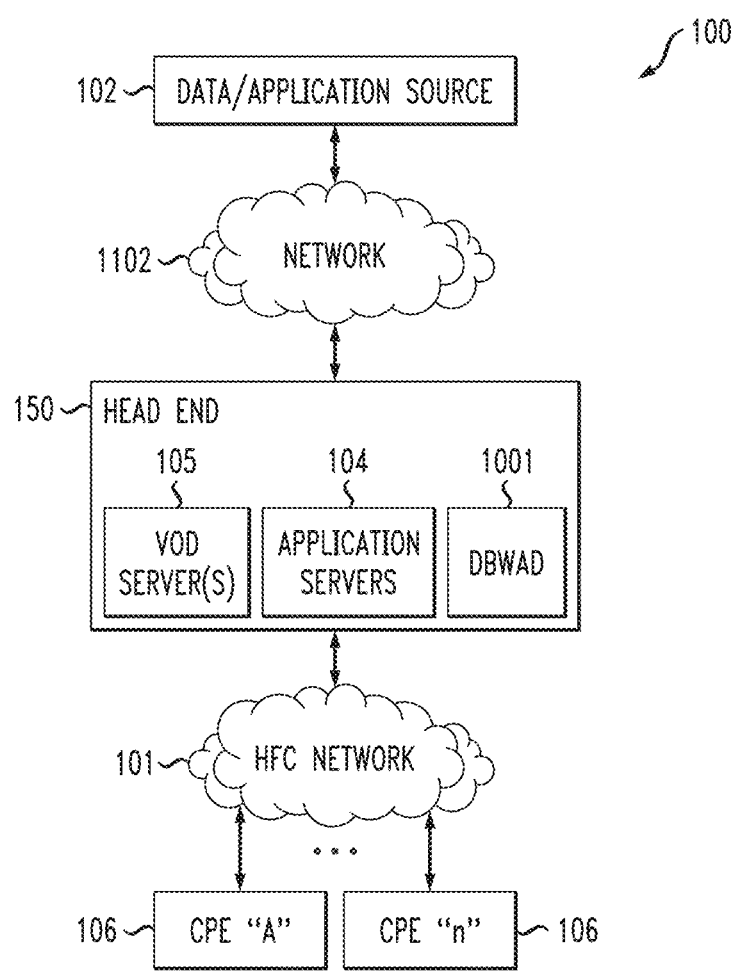
FIG. 2 is a functional block diagram illustrating an exemplary hybrid fiber-coaxial (HFC) divisional network configuration, useful within the system of FIG. 1.

FIG. 2 is a functional block diagram illustrating an exemplary content-based (e.g., hybrid fiber-coaxial (HFC)) divisional network configuration, useful within the system of FIG. 1. See, for example, US Patent Publication 2006/0130107 of Gonder et al., entitled "Method and apparatus for high bandwidth data transmission in content-based networks," the complete disclosure of which is expressly incorporated by reference herein in its entirety for all purposes. The various components of the network 100 include (i) one or more data and application origination points 102; (ii) one or more application distribution servers 104; (iii) one or more video-on-demand (VOD) servers 105, and (v) consumer premises equipment or customer premises equipment (CPE). The distribution server(s) 104, VOD servers 105 and CPE(s) 106 are connected via a bearer (e.g., HFC) network 101. Servers 104, 105 can be located in head end 150. A simple architecture is shown in FIG. 2 for illustrative brevity, although it will be recognized that comparable architectures with multiple origination points, distribution servers, VOD servers, and/or CPE devices (as well as different network topologies) may be utilized consistent with embodiments of the invention. For example, the head-end architecture of FIG. 3 (described in greater detail below) may be used.

It should be noted that the exemplary CPE 106 is an integrated solution including a cable modem (e.g., DOCSIS) and one or more wireless routers. Other embodiments could employ a two-box solution; i.e., separate cable modem and routers suitably interconnected, which nevertheless, when interconnected, can provide equivalent functionality. Furthermore, FTTH networks can employ S-ONUs as CPE, as discussed elsewhere herein.

The data/application origination point 102 comprises any medium that allows data and/or applications (such as a VOD-based or "Watch TV" application) to be transferred to a distribution server 104, for example, over network 1102. This can include for example a third party data source, application vendor website, compact disk read-only memory (CD-ROM), external network interface, mass storage device (e.g., Redundant Arrays of Inexpensive Disks (RAID) system), etc. Such transference may be automatic, initiated upon the occurrence of one or more specified events (such as the receipt of a request packet or acknowledgement (ACK)), performed manually, or accomplished in any number of other modes readily recognized by those of ordinary skill, given the teachings herein. For example, in one or more embodiments, network 1102 may correspond to network 1046 of FIG. 1, and the data and application origination point may be, for example, within NDC 1098, RDC 1048, or on the Internet 1002. Head end 150, HFC network 101, and CPEs 106 thus represent the divisions which were represented by division head ends 150 in FIG. 1.

The application distribution server 104 comprises a computer system where such applications can enter the network system. Distribution servers per se are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other appropriate locations) that can be accessed by the relevant upstream network components. Non-limiting examples of relevant upstream network components, in the context of the HFC network, include a distribution server 104 or a cable modem termination system 156 (discussed below with regard to FIG. 3). The skilled artisan will be familiar with other relevant upstream network components for other kinds of networks (e.g. FTTH) as discussed herein. Non-limiting examples of CPE are set-top boxes, high-speed cable modems, and Advanced Wireless Gateways (AWGs) for providing high bandwidth Internet access in premises such as homes and businesses. Reference is also made to the discussion of an exemplary FTTH network in connection with FIGS. 8 and 9.

Also included (for example, in head end 150) is a dynamic bandwidth allocation device (DBWAD) 1001 such as a global session resource manager, which is itself a non-limiting example of a session resource manager.

Figure 3:
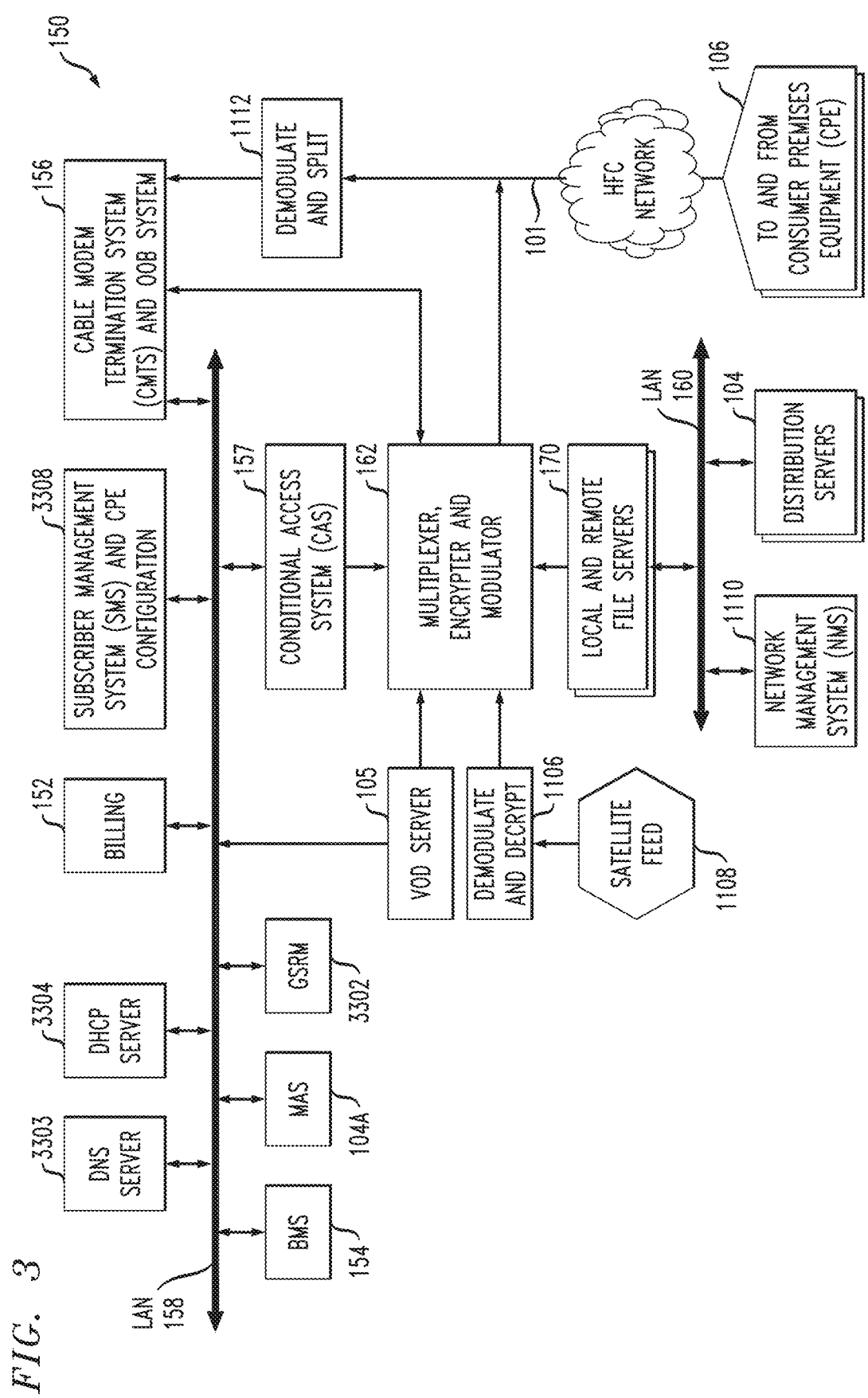
FIG. 3 is a functional block diagram illustrating one exemplary HFC cable network head-end configuration, useful within the system of FIG. 1.

FIG. 3 is a functional block diagram illustrating one exemplary HFC cable network head-end configuration, useful within the system of FIG. 1. As shown in FIG. 3, the head-end architecture 150 comprises typical head-end components and services including billing module 152, subscriber management system (SMS) and CPE configuration management module 3308, cable-modem termination system (CMTS) and out-of-band (OOB) system 156, as well as LAN(s) 158, 160 placing the various components in data communication with one another. In one or more embodiments, there are multiple CMTSs. Each may be coupled to an HER 1091, for example. See, e.g., FIGS. 1 and 2 of co-assigned U.S. Pat. No. 7,792,963 of inventors Gould and Danforth, entitled METHOD TO BLOCK UNAUTHOR- IZED NETWORK TRAFFIC IN A CABLE DATA NETWORK, the complete disclosure of which is expressly incorporated herein by reference in its entirety for all purposes.

It will be appreciated that while a bar or bus LAN topology is illustrated, any number of other arrangements (e.g., ring, star, etc.) may be used consistent with the invention. It will also be appreciated that the head-end configuration depicted in FIG. 3 is high-level, conceptual architecture and that each multi-service operator (MSO) may have multiple head-ends deployed using custom architectures.

The architecture 150 of FIG. 3 further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 158, although other architectures may be employed (such as for example where the VOD servers are associated with a core switching device such as an 802.3z Gigabit Ethernet device; or the VOD servers could be coupled to LAN 160). Since information is typically carried across multiple channels, the head-end should be adapted to acquire the information for the carried channels from various sources. Typically, the channels being delivered from the head-end 150 to the CPE 106 ("downstream") are multiplexed together in the head-end and sent to neighborhood hubs (refer to description of FIG. 4) via a variety of interposed network components.

Content (e.g., audio, video, etc.) is provided in each downstream (in-band) channel associated with the relevant service group. (Note that in the context of data communications, internet data is passed both downstream and upstream.) To communicate with the head-end or intermediary node (e.g., hub server), the CPE 106 may use the out-of-band (00B) or DOCSIS® (Data Over Cable Service Interface Specification) channels (registered mark of Cable Television Laboratories, Inc., 400 Centennial Parkway Louisville CO 80027, USA) and associated protocols (e.g., DOCSIS 1.x, 2.0, 3.0, or 3.1). The OpenCable™ Application Platform (OCAP) 1.0, 1.3.1, 2.0, 3.0 (and subsequent) specification (Cable Television laboratories Inc.) provides for exemplary networking protocols both downstream and upstream, although the invention is in no way limited to these approaches. All versions of the DOCSIS and OCAP specifications are expressly incorporated herein by reference in their entireties for all purposes.

Furthermore in this regard, DOCSIS is an international telecommunications standard that permits the addition of high-speed data transfer to an existing cable TV (CATV) system. It is employed by many cable television operators to provide Internet access (cable Internet) over their existing hybrid fiber-coaxial (HFC) infrastructure. Use of DOCSIS to transmit data on an HFC system is one non-limiting exemplary application context for one or more embodiments. However, one or more embodiments are generally applicable to IP transport of data, regardless of what kind of functionality is employed. It is also worth noting that the use of DOCSIS Provisioning of EPON (Ethernet over Passive Optical Network) or "DPoE" (Specifications available from CableLabs, Louisville, CO, USA) enables the transmission of high-speed data over PONs using DOCSIS back-office systems and processes.

It will also be recognized that multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

In some instances, material may also be obtained from a satellite feed 1108; such material is demodulated and decrypted in block 1106 and fed to block 162. Conditional access system 157 may be provided for access control purposes. Network management system 1110 may provide appropriate management functions. Note also that signals from MEM 162 and upstream signals from network 101 that have been demodulated and split in block 1112 are fed to CMTS and OOB system 156.

Also included in FIG. 3 are a global session resource manager (GSRM) 3302, a Mystro Application Server 104A, and a business management system 154, all of which are coupled to LAN 158. GSRM 3302 is one specific form of a DBWAD 1001 and is a non-limiting example of a session resource manager.

An ISP DNS server could be located in the head-end as shown at 3303, but it can also be located in a variety of other places. One or more Dynamic Host Configuration Protocol (DHCP) server(s) 3304 can also be located where shown or in different locations.

Figure 4:
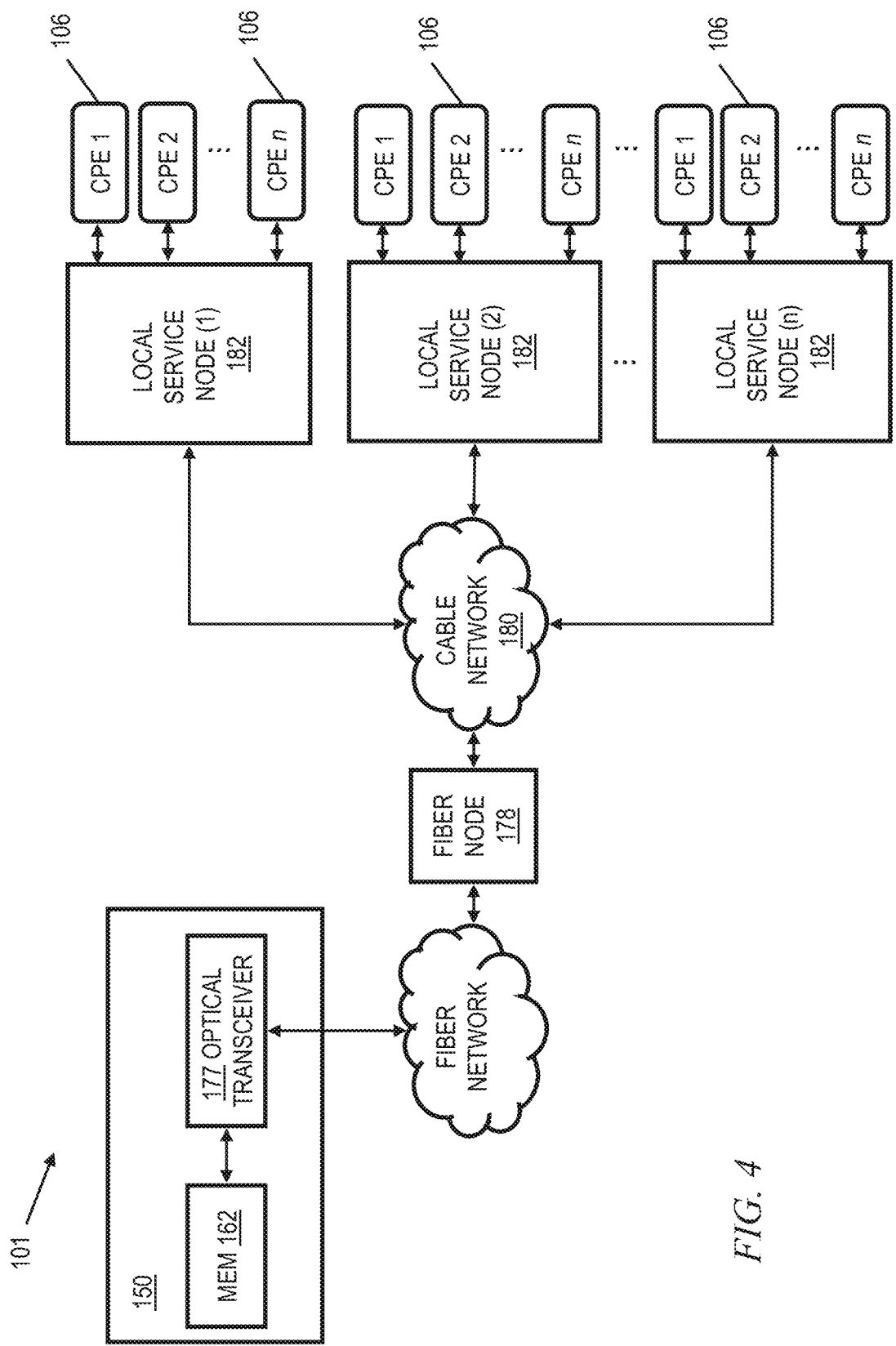
FIG. 4 is a functional block diagram illustrating one exemplary local service node configuration useful within the system of FIG. 1.

As shown in FIG. 4, the network 101 of FIGS. 2 and 3 comprises a fiber/coax arrangement wherein the output of the MEM 162 of FIG. 3 is transferred to the optical domain (such as via an optical transceiver 177 at the head-end 150 or further downstream). The optical domain signals are then distributed over a fiber network to a fiber node 178, which further distributes the signals over a distribution network 180 (typically coax) to a plurality of local servicing nodes 182. This provides an effective 1-to-N expansion of the network at the local service end. Each node 182 services a number of CPEs 106. Further reference may be had to US Patent Publication 2007/0217436 of Markley et al., entitled "Methods and apparatus for centralized content and data delivery," the complete disclosure of which is expressly incorporated herein by reference in its entirety for all purposes. In one or more embodiments, the CPE 106 includes a cable modem, such as a DOCSIS-compliant cable modem (DCCM). Please note that the number n of CPE 106 per node 182 may be different than the number n of nodes 182, and that different nodes may service different numbers n of CPE.

Certain additional aspects of video or other content delivery will now be discussed for completeness, it being understood that embodiments of the invention have broad applicability to TCP/IP network connectivity for delivery of messages and/or content. Again, delivery of data over a video (or other) content network is but one non-limiting example of a context where one or more embodiments could be implemented. US Patent Publication 2003-0056217 of Paul D. Brooks, entitled "Technique for Effectively Providing Program Material in a Cable Television System," the complete disclosure of which is expressly incorporated herein by reference for all purposes, describes one exemplary broadcast switched digital architecture, although it will be recognized by those of ordinary skill that other approaches and architectures may be substituted. In a cable television system in accordance with the Brooks invention, program materials are made available to subscribers in a neighborhood on an as-needed basis. Specifically, when a subscriber at a set-top terminal selects a program channel to watch, the selection request is transmitted to a head end of the system. In response to such a request, a controller in the head end determines whether the material of the selected program channel has been made available to the neighborhood. If it has been made available, the controller identifies to the set-top terminal the carrier which is carrying the requested program material, and to which the set-top terminal tunes to obtain the requested program material. Otherwise, the controller assigns an unused carrier to carry the requested program material, and informs the set-top terminal of the identity of the newly assigned carrier. The controller also retires those carriers assigned for the program channels which are no longer watched by the subscribers in the neighborhood. Note that reference is made herein, for brevity, to features of the "Brooks invention"—it should be understood that no inference should be drawn that such features are necessarily present in all claimed embodiments of Brooks. The Brooks invention is directed to a technique for utilizing limited network bandwidth to distribute program materials to subscribers in a community access television (CATV) system. In accordance with the Brooks invention, the CATV system makes available to subscribers selected program channels, as opposed to all of the program channels furnished by the system as in prior art. In the Brooks CATV system, the program channels are provided on an as needed basis, and are selected to serve the subscribers in the same neighborhood requesting those channels.

US Patent Publication 2010-0313236 of Albert Straub, entitled "TECHNIQUES FOR UPGRADING SOFTWARE IN A VIDEO CONTENT NETWORK," the complete disclosure of which is expressly incorporated herein by reference for all purposes, provides additional details on the aforementioned dynamic bandwidth allocation device 1001.

US Patent Publication 2009-0248794 of William L. Helms, entitled "SYSTEM AND METHOD FOR CONTENT SHARING," the complete disclosure of which is expressly incorporated herein by reference for all purposes, provides additional details on CPE in the form of a converged premises gateway device. Related aspects are also disclosed in US Patent Publication 2007-0217436 of Markley et al, entitled "METHODS AND APPARATUS FOR CENTRALIZED CONTENT AND DATA DELIVERY," the complete disclosure of which is expressly incorporated herein by reference for all purposes.

Figure 5:
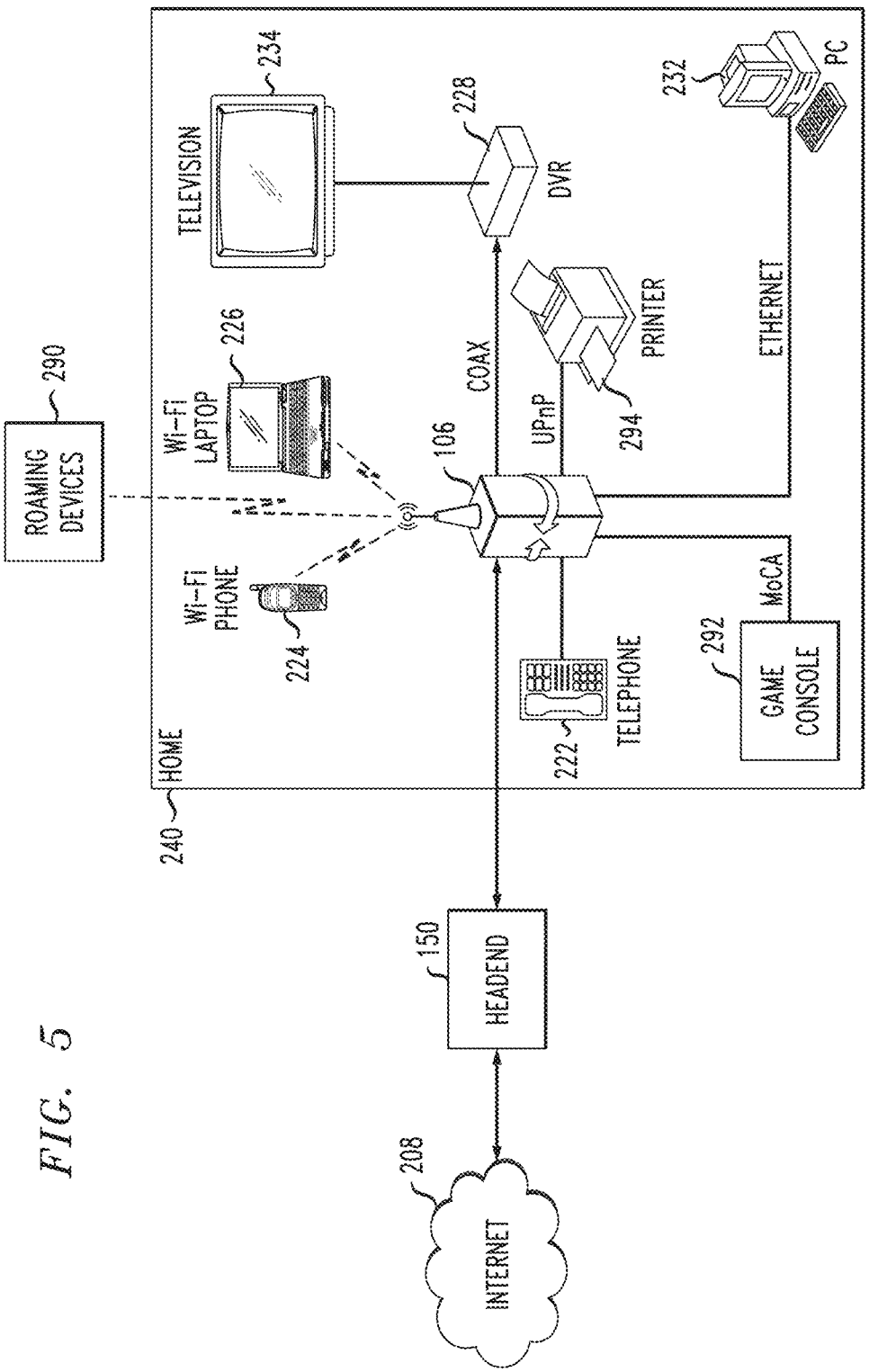
FIG. 5 is a functional block diagram of a premises network, including an exemplary centralized customer premises equipment (CPE) unit, interfacing with a head end such as that of FIG. 3.
Figure 6:
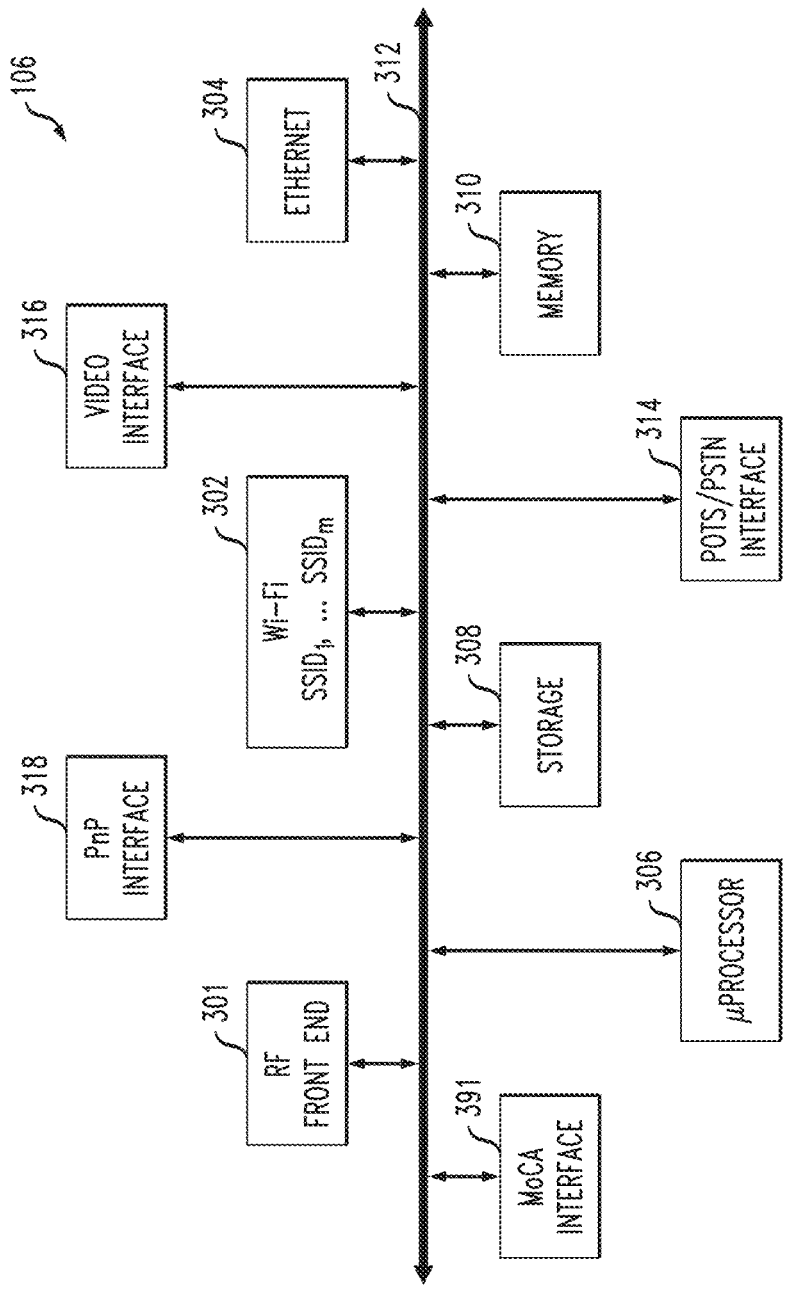
FIG. 6 is a functional block diagram of an exemplary centralized CPE unit, useful within the system of FIG. 1.

Reference should now be had to FIG. 5, which presents a block diagram of a premises network interfacing with a head end of an MSO or the like, providing Internet access. An exemplary advanced wireless gateway comprising CPE 106 is depicted as well. It is to be emphasized that the specific form of CPE 106 shown in FIGS. 5 and 6 is exemplary and non-limiting, and shows a number of optional features. Many other types of CPE can be employed in one or more embodiments; for example, a cable modem, DSL modem, and the like. The CPE can also be a Service Optical Network Unit (S-ONU) for FTTH deployment—see FIGS. 8 and 9 and accompanying text.

CPE 106 includes an advanced wireless gateway which connects to a head end 150 or other hub of a network, such as a video content network of an MSO or the like. The head end is coupled also to an internet (e.g., the Internet) 208 which is located external to the head end 150, such as via an Internet (IP) backbone or gateway (not shown).

The head end is in the illustrated embodiment coupled to multiple households or other premises, including the exemplary illustrated household 240. In particular, the head end (for example, a cable modem termination system 156 thereof) is coupled via the aforementioned HFC network and local coaxial cable or fiber drop to the premises, including the consumer premises equipment (CPE) 106. The exemplary CPE 106 is in signal communication with any number of different devices including, e.g., a wired telephony unit 222, a Wi-Fi or other wireless-enabled phone 224, a Wi-Fi or other wireless-enabled laptop 226, a session initiation protocol (SIP) phone, an H.323 terminal or gateway, etc. Additionally, the CPE 106 is also coupled to a digital video recorder (DVR) 228 (e.g., over coax), in turn coupled to television 234 via a wired or wireless interface (e.g., cabling, PAN or 802.15 UWB micro-net, etc.). CPE 106 is also in communication with a network (here, an Ethernet network compliant with IEEE Std. 802.3, although any number of other network protocols and topologies could be used) on which is a personal computer (PC) 232.

Other non-limiting exemplary devices that CPE 106 may communicate with include a printer 294; for example over a universal plug and play (UPnP) interface, and/or a game console 292; for example, over a multimedia over coax alliance (MoCA) interface. In some instances, CPE 106 is also in signal communication with one or more roaming devices, generally represented by block 290.

A "home LAN" (HLAN) is created in the exemplary embodiment, which may include for example the network formed over the installed coaxial cabling in the premises, the Wi-Fi network, and so forth.

During operation, the CPE 106 exchanges signals with the head end over the interposed coax (and/or other, e.g., fiber) bearer medium. The signals include e.g., Internet traffic (IPv4 or IPv6), digital programming and other digital signaling or content such as digital (packet-based; e.g., VoIP) telephone service. The CPE 106 then exchanges this digital information after demodulation and any decryption (and any demultiplexing) to the particular system(s) to which it is directed or addressed. For example, in one embodiment, a MAC address or IP address can be used as the basis of directing traffic within the client-side environment 240.

Any number of different data flows may occur within the network depicted in FIG. 5. For example, the CPE 106 may exchange digital telephone signals from the head end which are further exchanged with the telephone unit 222, the Wi-Fi phone 224, or one or more roaming devices 290. The digital telephone signals may be IP-based such as Voice-over-IP (VoIP), or may utilize another protocol or transport mechanism. The well-known session initiation protocol (SIP) may be used, for example, in the context of a "SIP phone" for making multi-media calls. The network may also interface with a cellular or other wireless system, such as for example a 3G IMS (IP multimedia subsystem) system, in order to provide multimedia calls between a user or consumer in the household domain 240 (e.g., using a SIP phone or H.323 terminal) and a mobile 3G telephone or personal media device (PMD) user via that user's radio access network (RAN).

The CPE 106 may also exchange Internet traffic (e.g., TCP/IP and other packets) with the head end 150 which is further exchanged with the Wi-Fi laptop 226, the PC 232, one or more roaming devices 290, or other device. CPE 106 may also receive digital programming that is forwarded to the DVR 228 or to the television 234. Programming requests and other control information may be received by the CPE 106 and forwarded to the head end as well for appropriate handling.

FIG. 6 is a block diagram of one exemplary embodiment of the CPE 106 of FIG. 5. The exemplary CPE 106 includes an RF front end 301, Wi-Fi interface 302, video interface 316, "Plug n' Play" (PnP) interface 318 (for example, a UPnP interface) and Ethernet interface 304, each directly or indirectly coupled to a bus 312. In some cases, Wi-Fi interface 302 comprises a single wireless access point (WAP) running multiple ("m") service set identifiers (SSIDs). In some cases, multiple SSIDs, which could represent different applications, are served from a common WAP. For example, SSID 1 is for the home user, while SSID 2 may be for a managed security service, SSID 3 may be a managed home networking service, SSID 4 may be a hot spot, and so on. Each of these is on a separate IP subnetwork for security, accounting, and policy reasons. The microprocessor 306, storage unit 308, plain old telephone service (POTS)/public switched telephone network (PSTN) interface 314, and memory unit 310 are also coupled to the exemplary bus 312, as is a suitable MoCA interface 391. The memory unit 310 typically comprises a random access memory (RAM) and storage unit 308 typically comprises a hard disk drive, an optical drive (e.g., CD-ROM or DVD), NAND flash memory, RAID (redundant array of inexpensive disks) configuration, or some combination thereof.

The illustrated CPE 106 can assume literally any discrete form factor, including those adapted for desktop, floor-standing, or wall-mounted use, or alternatively may be integrated in whole or part (e.g., on a common functional basis) with other devices if desired.

Again, it is to be emphasized that every embodiment need not necessarily have all the elements shown in FIG. 6—as noted, the specific form of CPE 106 shown in FIGS. 5 and 6 is exemplary and non-limiting, and shows a number of optional features. Yet again, many other types of CPE can be employed in one or more embodiments; for example, a cable modem, DSL modem, and the like.

It will be recognized that while a linear or centralized bus architecture is shown as the basis of the exemplary embodiment of FIG. 6, other bus architectures and topologies may be used. For example, a distributed or multi-stage bus architecture may be employed. Similarly, a "fabric" or other mechanism (e.g., crossbar switch, RAPIDIO interface, non-blocking matrix, TDMA or multiplexed system, etc.) may be used as the basis of at least some of the internal bus communications within the device. Furthermore, many if not all of the foregoing functions may be integrated into one or more integrated circuit (IC) devices in the form of an ASIC or "system-on-a-chip" (SoC). Myriad other architectures well known to those in the data processing and computer arts may accordingly be employed.

Yet again, it will also be recognized that the CPE configuration shown is essentially for illustrative purposes, and various other configurations of the CPE 106 are consistent with other embodiments of the invention. For example, the CPE 106 in FIG. 6 may not include all of the elements shown, and/or may include additional elements and interfaces such as for example an interface for the HomePlug A/V standard which transmits digital data over power lines, a PAN (e.g., 802.15), Bluetooth, or other short-range wireless interface for localized data communication, etc.

A suitable number of standard 10/100/1000 Base T Ethernet ports for the purpose of a Home LAN connection are provided in the exemplary device of FIG. 6; however, it will be appreciated that other rates (e.g., Gigabit Ethernet or 10-Gig-E) and local networking protocols (e.g., MoCA, USB, etc.) may be used. These interfaces may be serviced via a WLAN interface, wired RJ-45 ports, or otherwise. The CPE 106 can also include a plurality of RJ-11 ports for telephony interface, as well as a plurality of USB (e.g., USB 2.0) ports, and IEEE-1394 (Firewire) ports. S-video and other signal interfaces may also be provided if desired.

During operation of the CPE 106, software located in the storage unit 308 is run on the microprocessor 306 using the memory unit 310 (e.g., a program memory within or external to the microprocessor). The software controls the operation of the other components of the system, and provides various other functions within the CPE. Other system software/firmware may also be externally reprogrammed, such as using a download and reprogramming of the contents of the flash memory, replacement of files on the storage device or within other non-volatile storage, etc. This allows for remote reprogramming or reconfiguration of the CPE 106 by the MSO or other network agent.

It should be noted that some embodiments provide a cloud-based user interface, wherein CPE 106 accesses a user interface on a server in the cloud, such as in NDC 1098.

The RF front end 301 of the exemplary embodiment comprises a cable modem of the type known in the art. In some cases, the CPE just includes the cable modem and omits the optional features. Content or data normally streamed over the cable modem can be received and distributed by the CPE 106, such as for example packetized video (e.g., IPTV). The digital data exchanged using RF front end 301 includes IP or other packetized protocol traffic that provides access to internet service. As is well known in cable modem technology, such data may be streamed over one or more dedicated QAMs resident on the HFC bearer medium, or even multiplexed or otherwise combined with QAMs allocated for content delivery, etc. The packetized (e.g., IP) traffic received by the CPE 106 may then be exchanged with other digital systems in the local environment 240 (or outside this environment by way of a gateway or portal) via, e.g. the Wi-Fi interface 302, Ethernet interface 304 or plug-and-play (PnP) interface 318.

Additionally, the RF front end 301 modulates, encrypts/multiplexes as required, and transmits digital information for receipt by upstream entities such as the CMTS or a network server. Digital data transmitted via the RF front end 301 may include, for example, MPEG-2 encoded programming data that is forwarded to a television monitor via the video interface 316. Programming data may also be stored on the CPE storage unit 308 for later distribution by way of the video interface 316, or using the Wi-Fi interface 302, Ethernet interface 304, Firewire (IEEE Std. 1394), USB/USB2, or any number of other such options.

Other devices such as portable music players (e.g., MP3 audio players) may be coupled to the CPE 106 via any number of different interfaces, and music and other media files downloaded for portable use and viewing.

In some instances, the CPE 106 includes a DOCSIS cable modem for delivery of traditional broadband Internet services. This connection can be shared by all Internet devices in the premises 240; e.g. Internet protocol television (IPTV) devices, PCs, laptops, etc., as well as by roaming devices 290. In addition, the CPE 106 can be remotely managed (such as from the head end 150, or another remote network agent) to support appropriate IP services. Some embodiments could utilize a cloud-based user interface, wherein CPE 106 accesses a user interface on a server in the cloud, such as in NDC 1098.

In some instances the CPE 106 also creates a home Local Area Network (LAN) utilizing the existing coaxial cable in the home. For example, an Ethernet-over-coax based technology allows services to be delivered to other devices in the home utilizing a frequency outside (e.g., above) the traditional cable service delivery frequencies. For example, frequencies on the order of 1150 MHz could be used to deliver data and applications to other devices in the home such as PCs, PMDs, media extenders and set-top boxes. The coaxial network is merely the bearer; devices on the network utilize Ethernet or other comparable networking protocols over this bearer.

The exemplary CPE 106 shown in FIGS. 5 and 6 acts as a Wi-Fi access point (AP), thereby allowing Wi-Fi enabled devices to connect to the home network and access Internet, media, and other resources on the network. This functionality can be omitted in one or more embodiments.

In one embodiment, Wi-Fi interface 302 comprises a single wireless access point (WAP) running multiple ("m") service set identifiers (SSIDs). One or more SSIDs can be set aside for the home network while one or more SSIDs can be set aside for roaming devices 290.

A premises gateway software management package (application) is also provided to control, configure, monitor and provision the CPE 106 from the cable head-end 150 or other remote network node via the cable modem (DOCSIS) interface. This control allows a remote user to configure and monitor the CPE 106 and home network. Yet again, it should be noted that some embodiments could employ a cloud-based user interface, wherein CPE 106 accesses a user interface on a server in the cloud, such as in NDC 1098.

The MoCA interface 391 can be configured, for example, in accordance with the MoCA 1.0, 1.1, or 2.0 specifications.

As discussed above, the optional Wi-Fi wireless interface 302 is, in some instances, also configured to provide a plurality of unique service set identifiers (SSIDs) simultaneously. These SSIDs are configurable (locally or remotely), such as via a web page.

Figure 8:
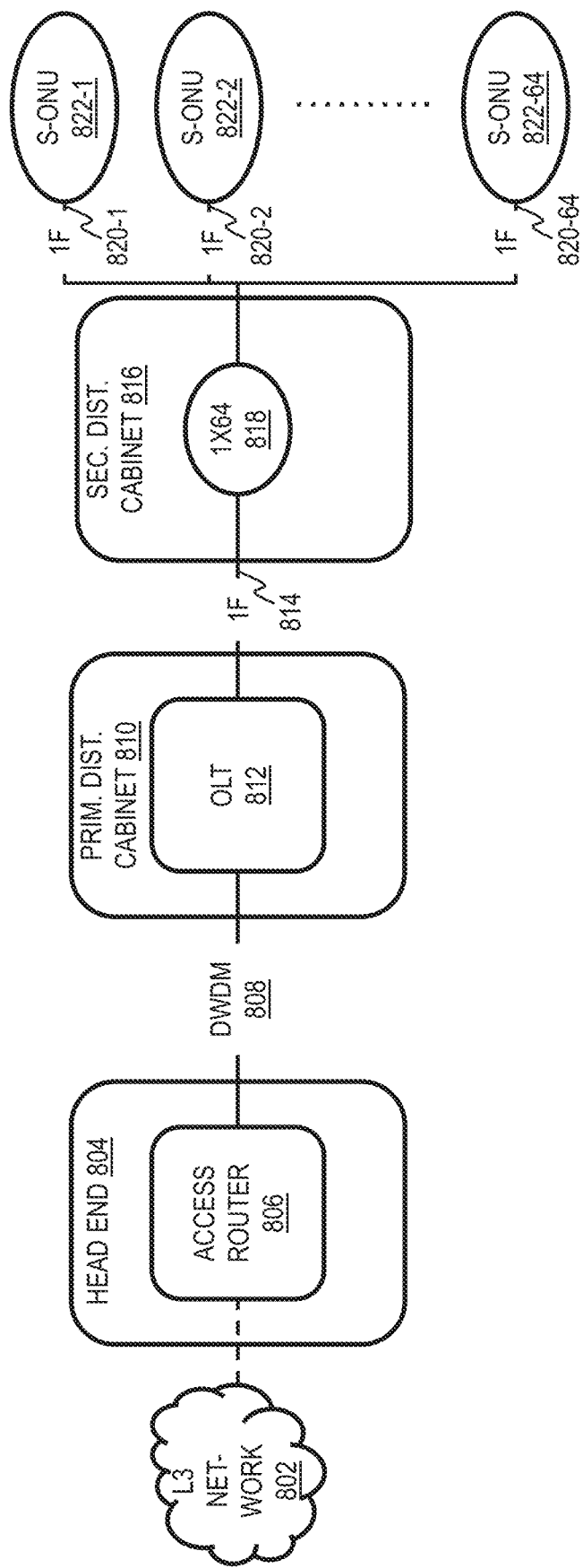
FIG. 8 is a functional block diagram illustrating an exemplary FTTH system, which is one exemplary system within which one or more embodiments could be employed.

As noted, there are also fiber networks for fiber to the home (FTTH) deployments (also known as fiber to the premises or FTTP), where the CPE is a Service ONU (S-ONU; ONU=optical network unit). Referring now to FIG. 8, L3 network 802 generally represents the elements in FIG. 1 upstream of the head ends 150, while head end 804, including access router 806, is an alternative form of head end that can be used in lieu of or in addition to head ends 150 in one or more embodiments. Head end 804 is suitable for FTTH implementations. Access router 806 of head end 804 is coupled to optical line terminal 812 in primary distribution cabinet 810 via dense wavelength division multiplexing (DWDM) network 808. Single fiber coupling 814 is then provided to a 1:64 splitter 818 in secondary distribution cabinet 816 which provides a 64:1 expansion to sixty-four S-ONUs 822-1 through 822-64 (in multiple premises) via sixty-four single fibers 820-1 through 820-64, it being understood that a different ratio splitter could be used in other embodiments and/or that not all of the 64 (or other number of) outlet ports are necessarily connected to an S-ONU.

Figure 9:
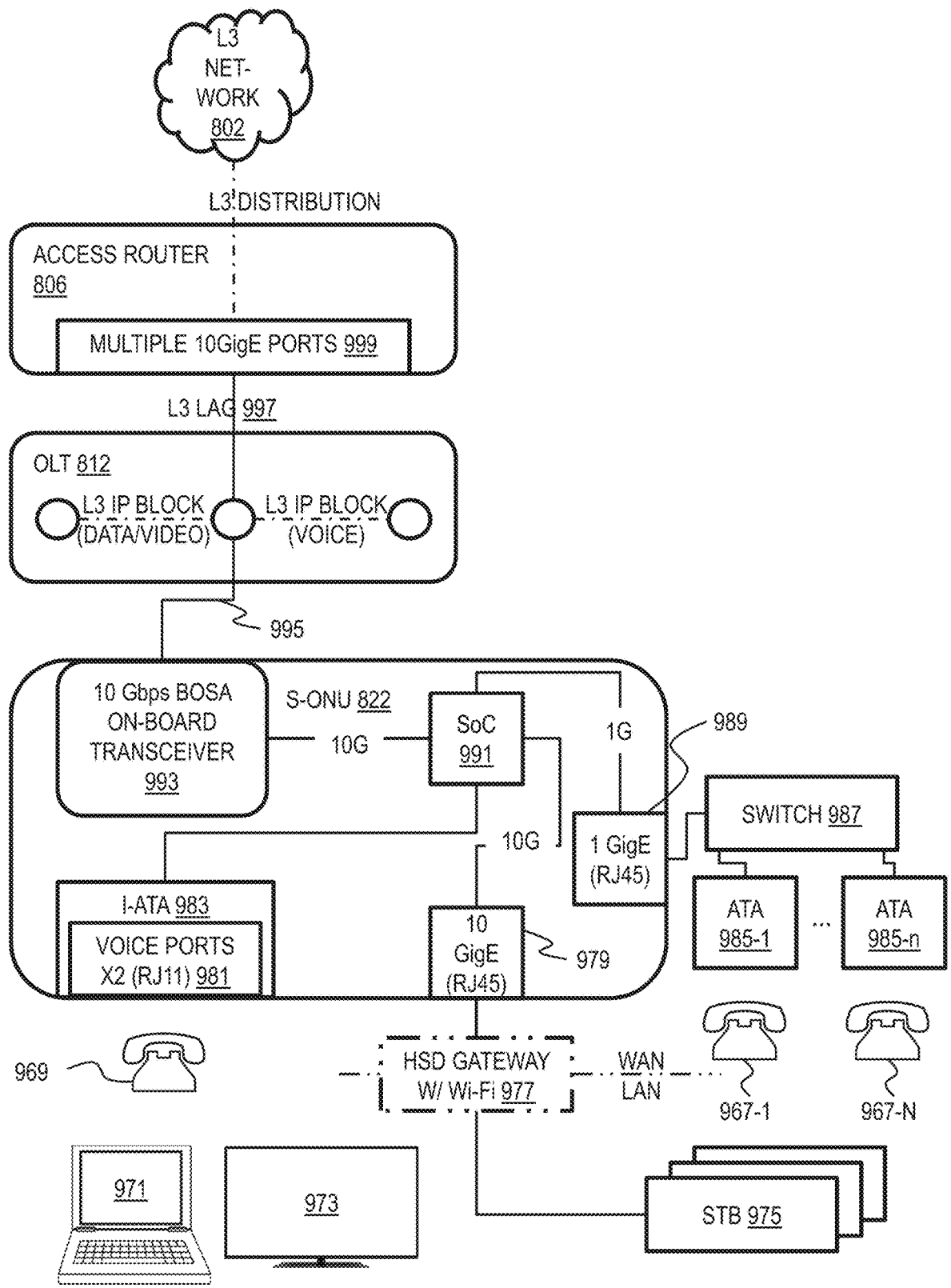
FIG. 9 is a functional block diagram of an exemplary centralized S-ONU CPE unit interfacing with the system of FIG. 8.

Giving attention now to FIG. 9, wherein elements similar to those in FIG. 8 have been given the same reference number, access router 806 is provided with multiple ten-Gigabit Ethernet ports 999 and is coupled to OLT 812 via L3 (layer 3) link aggregation group (LAG) 997. OLT 812 can include an L3 IP block for data and video, and another L3 IP block for voice, for example. In a non-limiting example, S-ONU 822 includes a 10 Gbps bi-directional optical sub-assembly (BOSA) on-board transceiver 993 with a 10G connection to system-on-chip (SoC) 991. SoC 991 is coupled to a 10 Gigabit Ethernet RJ45 port 979, to which a high-speed data gateway 977 with Wi-Fi capability is connected via category 5E cable. Gateway 977 is coupled to one or more set-top boxes 975 via category 5e, and effectively serves as a wide area network (WAN) to local area network (LAN) gateway. Wireless and/or wired connections can be provided to devices such as laptops 971, televisions 973, and the like, in a known manner. Appropriate telephonic capability can be provided. In a non-limiting example, residential customers are provided with an internal integrated voice gateway (I-ATA or internal analog telephone adapter) 983 coupled to SoC 991, with two RJ11 voice ports 981 to which up to two analog telephones 969 can be connected. Furthermore, in a non-limiting example, business customers are further provided with a 1 Gigabit Ethernet RJ45 port 989 coupled to SoC 991, to which switch 987 is coupled via Category 5e cable. Switch 987 provides connectivity for a desired number n (typically more than two) of analog telephones 967-1 through 967-n, suitable for the needs of the business, via external analog telephone adapters (ATAs) 985-1 through 985-n. The parameter "n" in FIG. 9 is not necessarily the same as the parameter "n" in other figures, but rather generally represents a desired number of units. Connection 995 can be, for example, via SMF (single-mode optical fiber).

In addition to "broadcast" content (e.g., video programming), the systems of FIGS. 1-6, 8, and 9 also deliver Internet data services using the Internet protocol (IP), although other protocols and transport mechanisms of the type well known in the digital communication art may be substituted. In the systems of FIGS. 1-6, the IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Generally, a system and methods for the detection, classification, notification, and mitigation of network traffic are disclosed. In one example embodiment, traffic flows are analyzed to identify suspected anomalous network traffic. Suspected anomalous network traffic exhibits, for example, unusual behavior in comparison to normal traffic flows. For example, botnet command and control traffic may be identified as suspected anomalous network traffic due to the volume of traffic, the destination of the traffic, and the like. In one example embodiment, the suspected anomalous network traffic is diverted, for example, to a deep packet inspection device where the suspected anomalous network traffic is subjected to further inspection and a determination of whether the network traffic is anomalous. Using the techniques disclosed herein, only a subset of the overall network traffic is subjected to deep packet inspection and a reduction in required DPI processing capacity can advantageously be attained.

In one example embodiment, a mitigation action(s) is performed if the network traffic is suspected of being anomalous, if network traffic is confirmed to be anomalous (such as following deep packet inspection), and the like. For example, the network traffic can be blocked, rate limited, and the like; a notification regarding the anomalous network traffic can be issued (such as to an administrator, security operations center, and/or customer); and the like. In one example embodiment, the mitigation action is performed if the network traffic is suspected of being anomalous. In one example embodiment, the mitigation action is performed only if the network traffic is confirmed to be anomalous.

If the network traffic is determined not to be anomalous, it is routed to its original destination and information regarding the false positive classification (as anomalous network traffic) is utilized to further refine the classification rules.

If it cannot be confirmed whether the traffic is anomalous, a number of actions may be taken, including rate limiting the traffic, issuing an alert, routing the traffic to its original destination, and the like. Thus, one or more embodiments identify and mitigate anomalous network traffic, such as malicious traffic, without the use of malicious signatures, IP addresses, and the like. It is worth noting that a traffic "pattern" can be considered a signature, in one or more embodiments, if, for example, the pattern is static as opposed to dynamic. In a typical case, however, network traffic behavior is normally not considered as a signature.

In general, the anomalous network traffic flows are identified in a number of ways. In one example embodiment, an anomalous flow is identified by the behavior of the network traffic. For example, a traffic source, such as a host computer, may be identified as normally exhibiting a certain behavior(s), such as communicating with certain destinations (such as certain IP addresses) using certain communication protocols and certain traffic volumes/patterns (such as a certain number of requests per second). A deviation from the normal behavior may result in the network traffic being suspected of being anomalous. For example, sending atypical volumes of data to destinations outside of a usual geographic area of the host computer transmitting the network traffic may result in the network traffic being suspected of being anomalous. Other types of behavior include, but are not limited to, IP traffic exceeding a specified threshold, IP traffic exceeding a dynamically generated threshold (the dynamic threshold can be defined by observing 'normal" traffic patterns), unusual packet sizes, unusual TCP flags (such as an excessive number of SYN packets), connection to an IP address that is not in the Alexa top 1 million addresses, connection to an IP address on an unusual port, connection to an IP address that no known host has ever connected to, connection to an IP address in a country that a given host has never connected to, look up of a domain name that is not in the Alexa top 1 million, look up of a domain name that no known host has ever looked up, and look up of a domain name that is new (such as a domain name that is less than 24 hours old). In some embodiments, supervised machine learning is used to find anomalous flows; KNN (K nearest neighbor) is a non-limiting example of a suitable technique.

In one example embodiment, information regarding network traffic is obtained from various devices, such as network devices, servers and the like. For example, netflow records regarding network traffic are obtained from one or more network routers. The netflow records contain, for example, the source IP address/port number, the destination IP address/port number, and the number of bytes transferred for a given traffic flow. Similarly, DNS flow information may be obtained from one or more DNS servers.

The network information is ingested and the network flows are classified into normal flows or anomalous flows based on classification rules. The initial classification rules may be predefined or may be established through training. In one example embodiment, machine learning is used to develop the rules that classify the network flows based, for example, on packets matching intrusion prevention system (IPS) signature rules. For example, a model may be developed by providing the machine learning system with information regarding network flows that have been classified as "normal" and with information regarding network flows that have been classified as "anomalous." The machine learning system is then trained using the provided information and the rules for a classification model that classifies the traffic as normal and anomalous are established, refined, or both.

In one example embodiment, the initial training of the model is performed using information from, for example, third-party threat intelligence providers that provide information identifying traffic that is malicious or suspected of being malicious (such as lists of malicious source IP addresses), traffic patterns that are malicious or suspected of being malicious (such as short lived connections to numerous hosts which could be indicative of malicious scanning behavior), and the like. The system can also be trained with non-malicious traffic by identifying non-malicious connections, connections going to non-malicious hosts and other devices, and the like. Once the system starts analyzing operational traffic (after training), the model is revised with, for example, traffic analyzed by a DPI device that labels the traffic as false positive or true positive malicious. In one example embodiment, traffic is randomly selected for diversion to the DPI device. The DPI device labels the traffic as malicious or non-malicious. The results (malicious or non-malicious) are submitted to the model and the model is revised according to the reports thereby training the model to detect malicious traffic.

In one example embodiment, mitigation rules are also developed. For example, mitigation rules for configuring network devices to route the "normal" traffic through to the original destination and to route the "anomalous" traffic to, for example, a Deep Packet Inspection (DPI) appliance, a rate limiting appliance, and the like may be defined. The device that receives the anomalous traffic would then, for example, inspect the payload, the traffic rates of the anomalous traffic, and the like of the diverted traffic. If the inspection confirms that the network traffic is anomalous, mitigation actions (or additional mitigation actions if actions have been performed based solely on the initial classification), such as rate limiting or filtering the anomalous network traffic, are performed.

If the deep packet inspection does not confirm that the suspected anomalous traffic exhibits anomalous traffic signatures, anomalous traffic rates, and the like, the network traffic is forwarded to its original destination and the information about the "false positive" classification (as anomalous traffic) is used to update the classification model and refine the classification rules.

Other aspects of network information, such as the DNS lookups that a host performs, can also be incorporated into the detection and mitigation technique. While the information for a DNS flow is different than the information of the netflows, the rules for classifying traffic using machine learning may be performed in a similar manner. For example, a machine learning system can be trained based on the DNS flow information (a flow of information about the DNS queries and the answers they provide, the DNS queries being submitted by clients to DNS recursive/authoritative servers). In one example embodiment, a separate machine learning system is trained for each type of flow information. For example, a first machine learning system is trained using netflow information and a second machine learning system is trained using DNS flow information. In one example embodiment, both DNS flow information and netflow information (along with other sources of information) are combined as different dimensions into one machine learning model.

In one example embodiment, due to privacy concerns and/or processing limitations (such as processing limitations of a DPI device), and the like, only some network traffic is subjected to classification. For example, only traffic corresponding to designated IP addresses or domain names may be classified.

In one example embodiment, the deep inspection device will perform a deep packet inspection, identify indicators of compromise (IOC), and determine if the suspicious traffic matches known threat detection signatures. For example, indicators of compromise in the traffic may be searched for, such as a source or destination IP address, a source or destination port, a protocol, a type, size, or contents of the payload, identification of a pattern in the traffic, a match of the pattern with known threat signatures, and the like. A pattern may include, but is not limited to, a combination of two or more of source IP address, destination IP address, source port, destination port, packet size, header metadata, protocol type, domain name, payload contents, file analysis, hash value, etc. In one or more embodiments, this pattern is compared to previously known malware signatures (in the history of the Internet) and a determination is made. The deep packet inspection device can pass or block the network traffic, and can validate an IP address to, for example, reduce false positives when searching for malicious IP addresses.

As described above, in one example embodiment, the mitigation action blocks the anomalous traffic, reroutes the anomalous traffic, and the like. A malicious bot, for example, may be rendered useless by blocking communications with the servers of the botnet. For example, although the bot might still be present on a customer's device, it becomes harmless since it is not able to get commands from its command and control server. In addition, the customer is informed about the bot infection and may take action to remove the malicious bot by running anti-virus software, upgrading the operating system (OS) of the device, and the like.

In one example embodiment, a user, such as a member of a security operations team, the customer of an ISP, and the like, is notified of suspected anomalous traffic via email and the like. The user may also be solicited to review and approve a mitigation action before it is initiated, in order to continue an active mitigation action, and the like. In one example embodiment, the user may pre-authorize the mitigation of any and all anomalous network traffic, or may specify the instances where a mitigation action is pre-authorized. For example, the user may pre-authorize a mitigation action to address anomalous network traffic originating from a particular device or IP address.

It should be noted that in one or more embodiments involving detecting and mitigating anomalous network traffic, after diverting and inspecting traffic, feedback is provided to the model in order to better train the model for future classification of traffic.

In one example embodiment, traffic flows are analyzed to classify the network traffic by type based on predefined rules. For example, network traffic may be classified by source, by destination, by content type, TCP flag, TCP/User Datagram Protocol (UDP) port, packet size, domain name, geolocation, Autonomous System path, Autonomous System destination, and the like. In one example embodiment, network traffic which cannot be classified based on the predefined rules is diverted, for example, to a deep packet inspection device where the network traffic is subjected to further inspection and classification, if possible. Using the techniques disclosed herein, only a subset of the overall network traffic is subjected to deep packet inspection and a reduction in required DPI processing capacity can advantageously be attained.

In one example embodiment, as described more fully above, information regarding network traffic is obtained from various devices, such as network devices, servers, and the like. For example, netflow records regarding network traffic are obtained from one or more network routers. The netflow records contain, for example, the source IP address/port number, the destination IP address/port number, and the number of bytes transferred for a given traffic flow. Similarly, DNS flow information may be obtained from one or more DNS servers.

The network information is ingested and the network flows are classified based on the network information and the classification rules. The initial classification rules may be predefined or may be established through training. In one example embodiment, the initial classification rules are obtained from, for example, third-party threat intelligence providers that provide information identifying traffic (such as lists of source IP addresses), traffic patterns, and the like.

Other aspects of network information, such as the DNS lookups that a host performs, can also be incorporated into the classification technique. Such information can be useful. While the information for a DNS flow is different than the information of the netflows, the rules for classifying traffic may be performed in a similar manner. For example, classification may be performed based on the DNS flow information (a flow of information about the DNS queries and the answers they provide, the DNS queries being submitted by clients to DNS recursive/authoritative servers). In one example embodiment, both DNS flow information and netflow information (along with other sources of information) are combined as different dimensions into one model.

In one example embodiment, due to privacy concerns and/or processing limitations (such as processing limitations of a DPI device), and the like, only some network traffic is subjected to classification. For example, only traffic corresponding to designated IP addresses or domain names may be classified.

In one example embodiment, the deep inspection device will perform a deep packet inspection and classify the network traffic based on various indicators. For example, indicators, such as a source or destination IP address, a source or destination port, a protocol, a type, size, or contents of the payload, identification of a pattern in the traffic, and the like, may be searched for. A pattern may include, but is not limited to, a combination of two or more of source IP address, destination IP address, source port, destination port, packet size, header metadata, protocol type, domain name, payload contents, file analysis, hash value, and the like.

Figure 10:
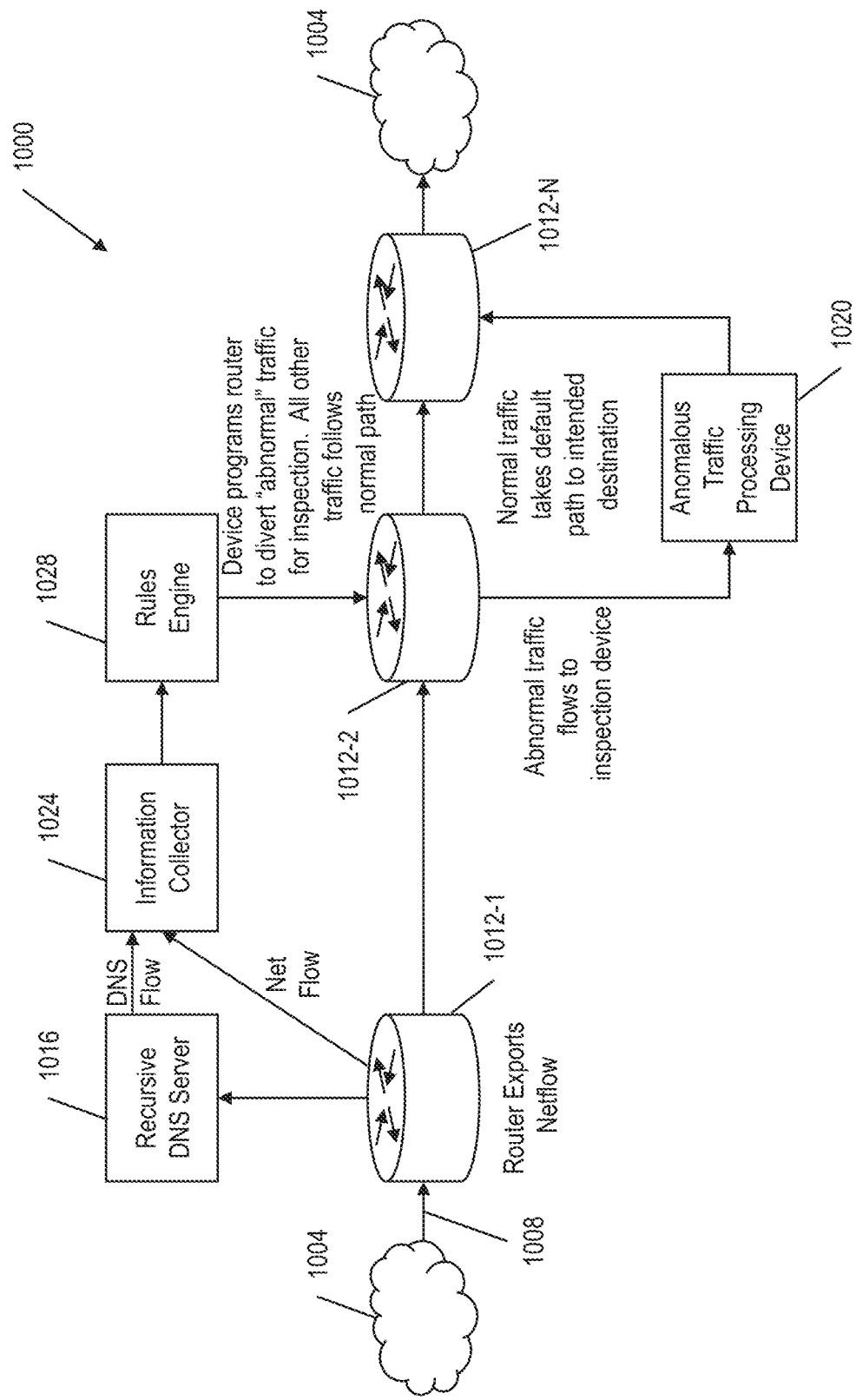
FIG. 10 is a block diagram of an example system for detecting and mitigating anomalous network traffic, in accordance with an example embodiment.

Reference should now be had to FIGS. 10-13. FIG. 10 is a block diagram of an example system 1000 for detecting and mitigating anomalous network traffic, in accordance with an example embodiment. In one example embodiment, network traffic 1008 emanating from multiple sources, such as host computers, user devices, and the like, is received via a network 1004. A network device 1012-1, such as a network router, routes the network traffic 1008 based on routing tables, routing rules, and the like. For example, the network traffic can be routed to: a recursive DNS server 1016 if the traffic is classified as normal traffic; an anomalous traffic processing device 1020 (such as a DPI appliance or rate limiting appliance) if the traffic is classified as anomalous traffic, and the like. If the anomalous traffic processing device 1020 determines that the network traffic is not anomalous, the network traffic is forwarded to its original destination 1004 via, for example, network device 1012-2 and 1012-N. If the anomalous traffic processing device 1020 confirms that the network traffic is anomalous, a mitigation action(s) is performed. For example, the anomalous traffic may be blocked, may be rate limited, and the like. Note that devices 1012-1, 1012-2 . . . 1012-N are referred to collectively herein as 1012.

Information collector 1024 collects information regarding the network traffic 1008. For example, information collector 1024 obtains DNS flow data from the recursive DNS server 1016, obtains netflow records from the network device 1012-1, and the like. A rules engine 1028 then generates rules for classifying and routing the network traffic based on the information collected by the information collector 1024. In one example embodiment, the rules engine 1028 uses machine learning to generate the rules of a classification model, as described more fully above.

Figure 11A:
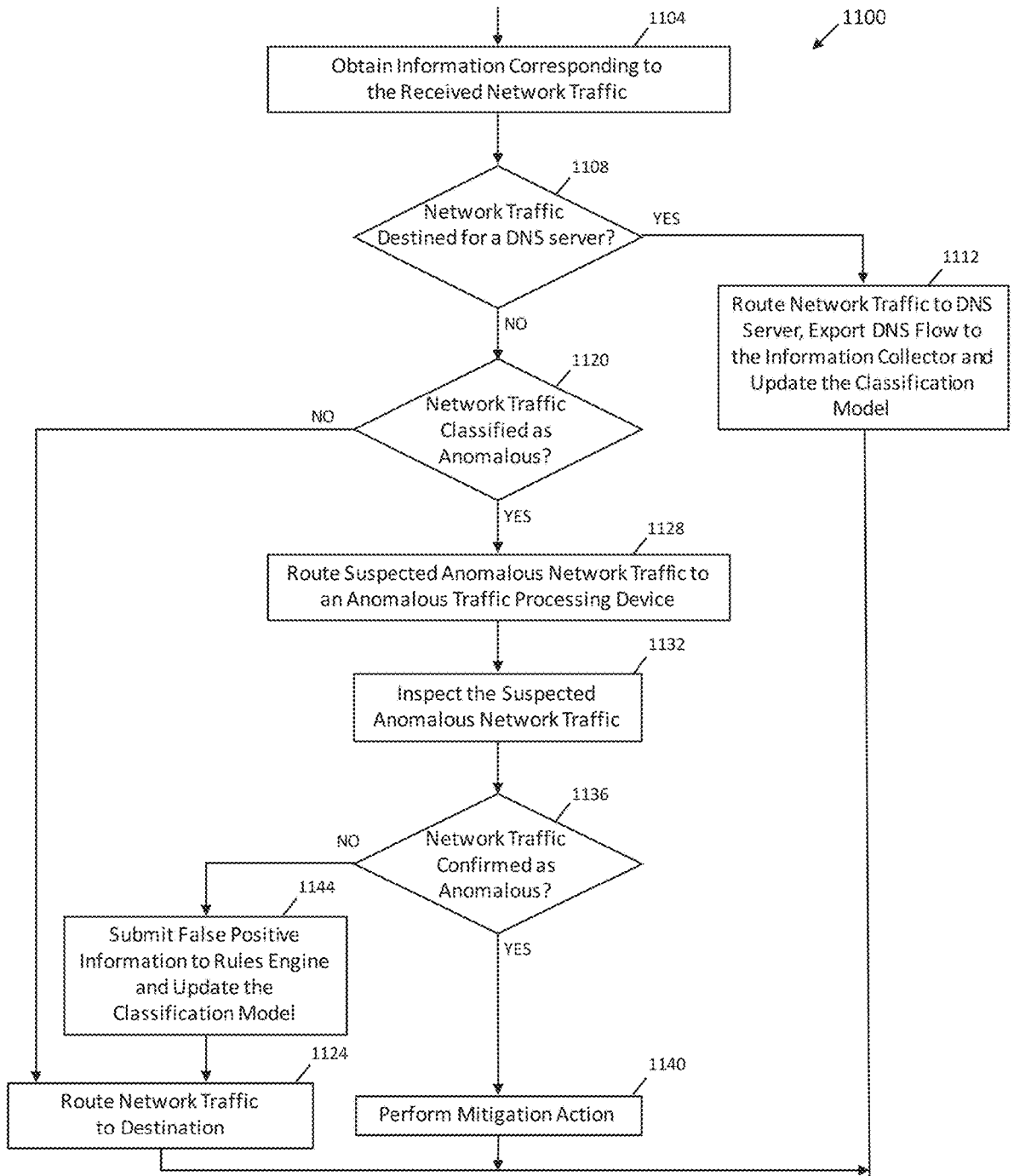
FIG. 11A is a flowchart of an example workflow for detecting and mitigating anomalous network traffic, in accordance with an example embodiment.

FIG. 11A is a flowchart of an example workflow 1100 for detecting and mitigating anomalous network traffic, in accordance with an example embodiment. In one example embodiment, information regarding network traffic is obtained from a network device (operation 1104). For example, netflow records regarding network traffic are obtained from the network device 1012-1 and DNS flow records are obtained from the recursive DNS server 1016. A check is performed to determine if the network traffic is destined for a recursive DNS server 1016 (decision block 1108). If the network traffic is destined for a recursive DNS server 1016 (YES branch of decision block 1108), the traffic terminates on the recursive DNS server 1016, the DNS flow is exported to the information collector 1024, and the classification model is refined based on the DNS flow information (operation 1112). The workflow 1100 then ends.

If the network traffic is not destined for the recursive DNS server 1016 (NO branch of decision block 1108), a check is performed to determine if the network traffic has been identified as anomalous (decision block 1120). If the network traffic has not been identified as anomalous (NO branch of decision block 1120), the network traffic is forwarded to its original destination (operation 1124) and the workflow 1100 ends; otherwise (YES branch of decision block 1120), the network traffic is routed to, for example, the anomalous traffic processing device 1020, such as a DPI (Deep Packet Inspection) appliance, a rate limiting appliance, and the like (operation 1128). The anomalous traffic processing device 1020 inspects network traffic (operation 1132). For example, the payload, the traffic rates, and the like of the diverted traffic may be inspected. A check is performed to determine if the network traffic is confirmed to be anomalous (decision block 1136). If the inspection reveals, for example, that the network traffic is anomalous (YES branch of decision block 1136), mitigation actions based on the mitigation rules, such as rate limiting or filtering the traffic, are performed (operation 1140).

If the rules do not identify any anomalous traffic (such as there are no malicious signature matches, no anomalous traffic rates, and the like; NO branch of decision block 1136), then the information about the "false positive" classification is submitted to the rules engine 1028 and the classification model is updated based on the information from the deep packet inspection device (operation 1144). The network traffic is then forwarded to its original destination (operation 1124). The workflow 1100 then ends.

Figure 11B:
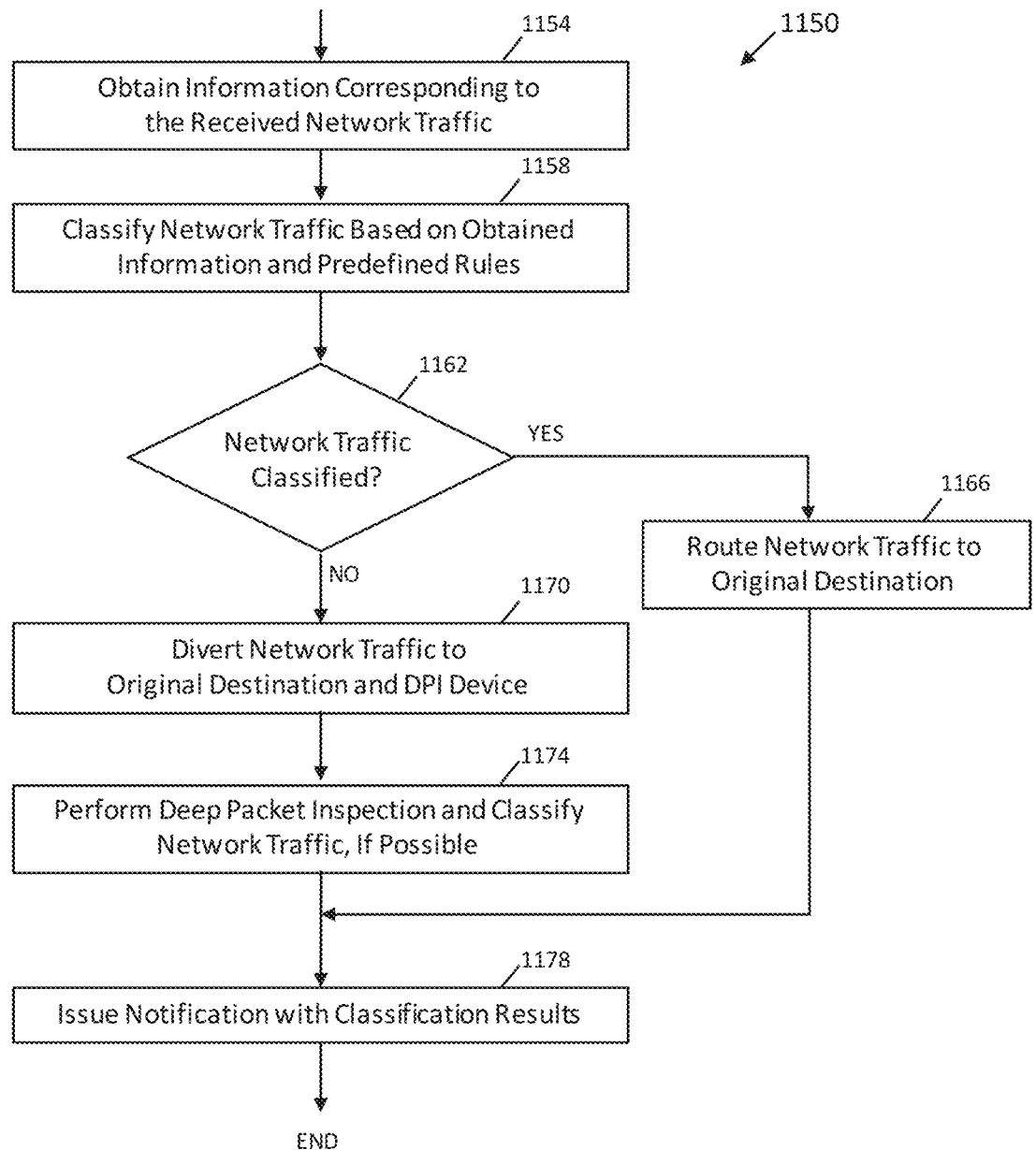
FIG. 11B is a flowchart of an example workflow for classifying network traffic, in accordance with an example embodiment.

FIG. 11B is a flowchart of an example workflow 1150 for classifying network traffic, in accordance with an example embodiment. In one example embodiment, information regarding network traffic is obtained from a network device (operation 1154). For example, netflow records regarding network traffic are obtained from the network device 1012-1 and DNS flow records are obtained from the recursive DNS server 1016. The network traffic is classified, if possible, based on predefined rules (operation 1158). For example, one rule may indicate that the destination port and source IP address in the network traffic is to be used as the criteria for classification. Another type of traffic classification is based on the DNS query from the client and reply from the recursive DNS server. In one example embodiment, network traffic is classified by the IP protocol that is being used, the packet sizes, and the geolocation information of the source IP address.

A check is performed to determine if the network traffic has been classified based on the predefined rules (decision block 1162). If the network traffic has not been classified (NO branch of decision block 1162), the network traffic is diverted from its normal path to a DPI (Deep Packet Inspection) appliance and to the original destination (operation 1170), the deep packet inspection device inspects and classifies the network traffic, if possible (operation 1174), and the method proceeds with operation 1178; otherwise, the network traffic is forwarded to its original destination (operation 1166) and the method 1150 proceeds with operation 1178. During operation 1178, a notification is issued indicating the results of the classification. The workflow 1150 then ends.

Figure 12:
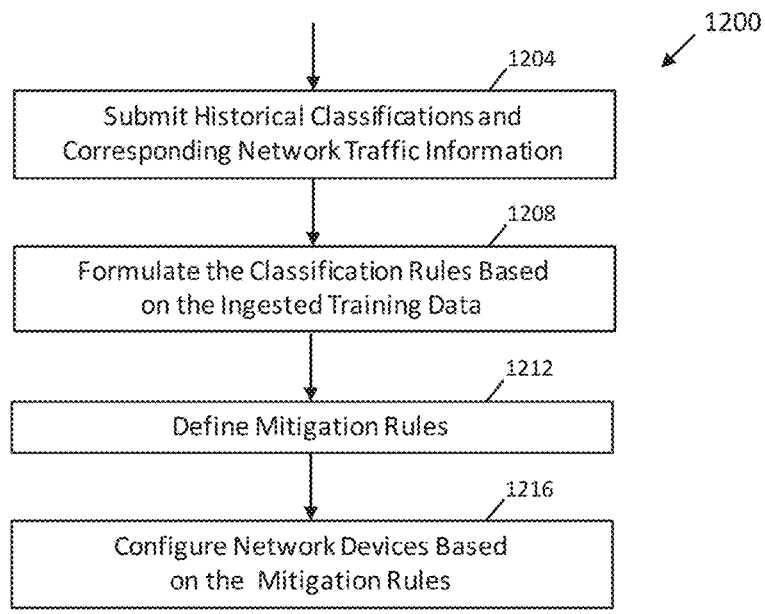
FIG. 12 is a flowchart of an example method for generating rules of a classification model and configuring mitigation actions, in accordance with an example embodiment.

FIG. 12 is a flowchart of an example method 1200 for generating rules of a classification model and configuring mitigation actions, in accordance with an example embodiment. In one example embodiment, training data, including information regarding historical classifications of network traffic and the corresponding network traffic information (such as netflows, DNS flows, and the like) is submitted to the rules engine 1028 for training (operation 1204). Classification rules are formulated based on the ingested information using, for example, supervised training (operation 1208). For example, supervised learning can be performed by the rules engine 1028 using the training data. One or more mitigation rules that describe how anomalous network traffic is to be handled are defined (operation 1212). The mitigation rules are then used to configure other devices, such as network devices 1012, deep packet inspection devices, rate limiters, and the like, to properly handle the anomalous traffic (operation 1216). For example, the mitigation rules may be forwarded to a network router to configure the network router to route normal traffic to its original destination, to reroute anomalous traffic to, for example, a deep packet inspection device, and the like. The method 1200 then ends.

Figure 13:
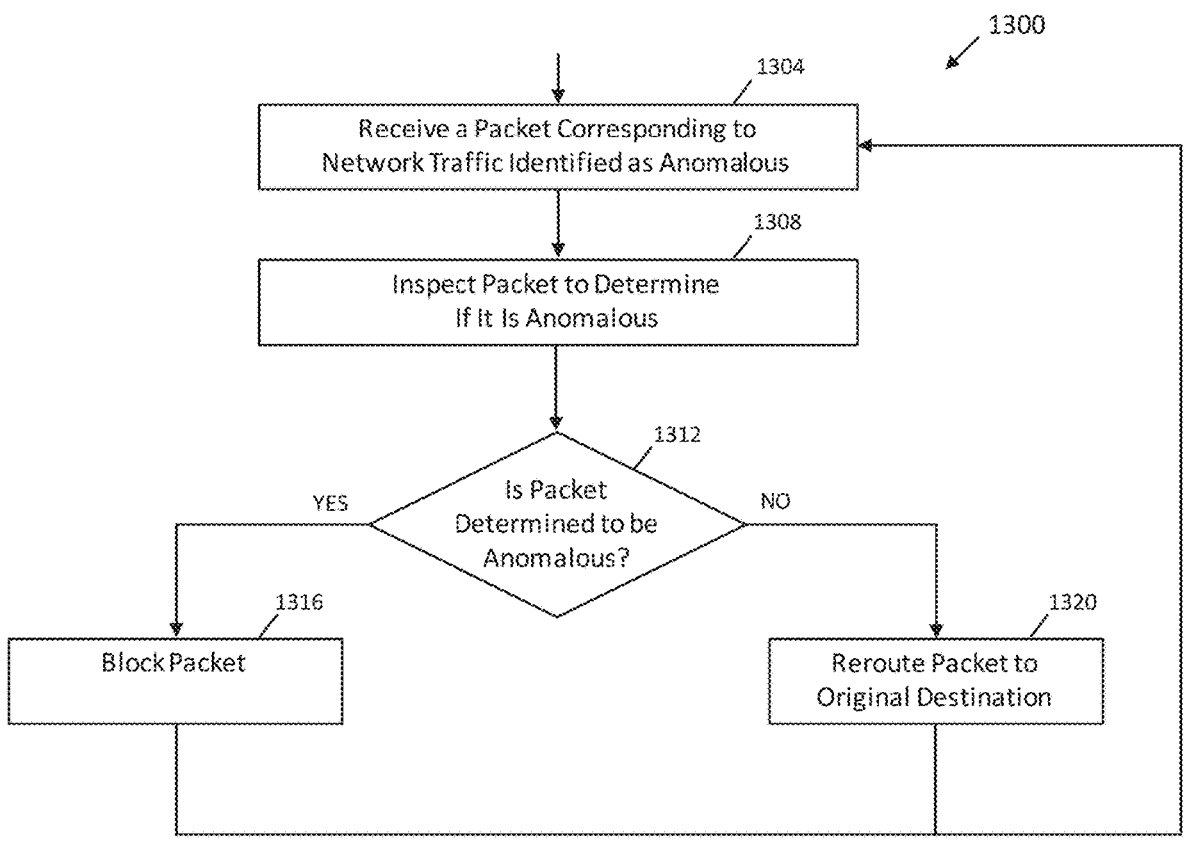
FIG. 13 is a flowchart of an example method for performing a deep inspection of a suspected anomalous packet, in accordance with an example embodiment.

FIG. 13 is a flowchart of an example method 1300 for performing a deep inspection of a suspected anomalous packet, in accordance with an example embodiment. In one example embodiment, a packet identified as anomalous is received by a deep packet inspection device residing, for example, in the ISP cloud (operation 1304). The packet is inspected to determine if it is or is not anomalous (operation 1308). For example, as described above, indicators of compromise in the traffic may be searched for, such as a destination IP address, a source or destination port, a protocol, a type, size, or contents of the payload, identification of a pattern in the traffic, a match of the pattern with known threat signatures, and the like. If the packet is determined to be anomalous (YES branch of decision block 1312), the deep packet inspection device blocks the packet (operation 1316) and the method 1300 proceeds with operation 1304; otherwise (NO branch of block 1312), the packet is rerouted, for example, to its original destination (operation 1320) and the method 1300 proceeds with operation 1304. In one example embodiment, the deep packet inspection device forwards information regarding the deep packet inspection to the rules engine 1028 for updating the classification model (not shown).

It is worth noting that, if a machine learning model is being used to identify anomalous traffic, then initial use of a training and test corpus can be carried out prior to initiating one or more method steps herein. Subsequently, feedback regarding what anomalous traffic turned out to be a true positive and what was a false positive is fed back into the machine learning model in one or more embodiments to train it so that it can better identify what is anomalous (and therefore needs more inspection) and what should be skipped. The skilled artisan will be familiar with annotation of a training corpus for initial training of a machine learning model as well as the retention of some data to form a test corpus; given the teachings herein, the skilled artisan will be able to use machine learning techniques to implement one or more embodiments.

Given the discussion thus far, it will be appreciated that, an exemplary method for detecting and mitigating malicious network traffic, according to an aspect of the invention, includes the operations of: with at least one processor in a network, obtaining information regarding network traffic flows (operation 1104); with the at least one processor in the network, generating a classification model (rules engine 1028) based on the obtained information, the classification model comprising one or more classification rules for classifying network traffic as normal or anomalous (operations 1144, 1208); with the at least one processor in the network, classifying the network traffic as anomalous or normal based on the generated classification model (rules engine 1028); and with the at least one processor in the network, initiating at least one mitigation action based on the network traffic being classified as anomalous (operation 1140).

In one aspect, an exemplary method for classifying network traffic comprises the operations of: with the at least one processor in the network, classifying the network traffic based on one or more classification rules and the obtained information (operation 1158); and with the at least one processor in the network, initiating at least one notification based on the classification of the network traffic (operation 1178).

In one aspect, a non-transitory computer readable medium comprises computer executable instructions which when executed by a computer cause the computer to perform a method comprising operations of: obtaining information regarding network traffic flows (operation 1104); and generating a classification model (rules engine 1028), based on the obtained information, the classification model comprising one or more classification rules for classifying network traffic as normal or anomalous (operations 1144, 1208).

In one aspect, an apparatus comprises a memory; and at least one processor, coupled to said memory, and operative to perform operations comprising: obtaining information regarding network traffic flows (operation 1104); and generating a classification model (rules engine 1028), based on the obtained information, the classification model comprising one or more classification rules for classifying network traffic as normal or anomalous (operations 1144, 1208).

In one example embodiment, the information comprises netflow records from a network device 1012. In one example embodiment, the information comprises DNS flow records from a DNS server 1016. In one example embodiment, the network traffic is classified as anomalous or normal. In one example embodiment, anomalous network traffic is blocked or rate limited in response to determining that the network traffic is anomalous (operation 1140). In one example embodiment, a user is notified in response to network traffic being classified as anomalous.

In one example embodiment, a user is solicited to review and approve a mitigation action before the mitigation action is initiated. In one example embodiment, one or more mitigation rules are defined (operation 1212). In one example embodiment, a network device 1012 is configured to route network traffic based on the one or more mitigation rules (operation 1216). In one example embodiment, the network device 1012 is configured to route normal network traffic to its original destination (operation 1214). In one example embodiment, the network device 1012 is configured to route anomalous network traffic for deep packet inspection (operation 1128).

In one example embodiment, the network traffic is routed to an original destination (operation 1124) and the one or more classification rules are updated based on information from the deep packet inspection 1020 regarding a false positive classification of the network traffic as anomalous network traffic (operation 1144), the routing and the updating being performed in response to confirming that the network traffic is not anomalous. In one example embodiment, the deep packet inspection 1020 triggers a blocking or rate limiting of the anomalous network traffic in response to confirming that the network traffic is anomalous (operation 1144). In one example embodiment, the one or more classification rules are determined using supervised learning based on a set of historically classified normal network flows and anomalous network flows (operations 1204-1208). In one example embodiment, the one or more rules are based on normal behavior of a given network traffic flow (operations 1204-1208).

System and Article of Manufacture Details

The invention can employ hardware aspects or a combination of hardware and software aspects. Software includes but is not limited to firmware, resident software, microcode, etc. One or more embodiments of the invention or elements thereof can be implemented in the form of an article of manufacture including a machine readable medium that contains one or more programs which when executed implement such step(s); that is to say, a computer program product including a tangible computer readable recordable storage medium (or multiple such media) with computer usable program code configured to implement the method steps indicated, when run on one or more processors. Furthermore, one or more embodiments of the invention or elements thereof can be implemented in the form of an apparatus including a memory and at least one processor that is coupled to the memory and operative to perform, or facilitate performance of, exemplary method steps.

Yet further, in another aspect, one or more embodiments of the invention or elements thereof can be implemented in the form of means for carrying out one or more of the method steps described herein; the means can include (i) specialized hardware module(s), (ii) software module(s) executing on one or more general purpose or specialized hardware processors, or (iii) a combination of (i) and (ii); any of (i)-(iii) implement the specific techniques set forth herein, and the software modules are stored in a tangible computer-readable recordable storage medium (or multiple such media). The means do not include transmission media per se or disembodied signals per se. Appropriate interconnections via bus, network, and the like can also be included.

Figure 7:
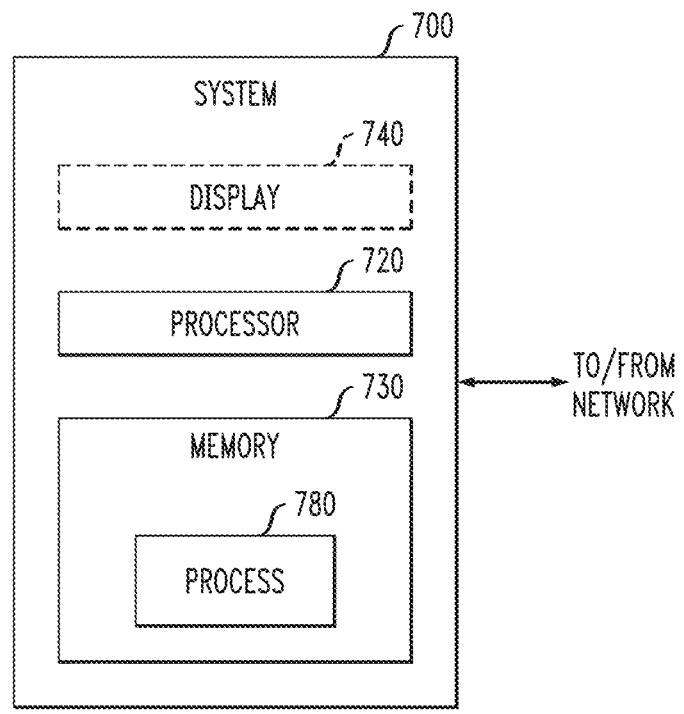
FIG. 7 is a block diagram of a computer system useful in connection with one or more aspects of the invention.

FIG. 7 is a block diagram of a system 700 that can implement at least some aspects of the invention, and is representative, for example, of the rules engine 1028 and/or one or more of the servers shown in the figures. As shown in FIG. 7, memory 730 configures the processor 720 to implement one or more methods, steps, and functions (collectively, shown as process 780 in FIG. 7). The memory 730 could be distributed or local and the processor 720 could be distributed or singular. Different steps could be carried out by different processors.

The memory 730 could be implemented as an electrical, magnetic or optical memory, or any combination of these or other types of storage devices. It should be noted that if distributed processors are employed, each distributed processor that makes up processor 720 generally contains its own addressable memory space. It should also be noted that some or all of computer system 700 can be incorporated into an application-specific or general-use integrated circuit. For example, one or more method steps could be implemented in hardware in an ASIC or via a field-programmable gate array (FPGA) rather than using firmware. Display 740 is representative of a variety of possible input/output devices (e.g., keyboards, mice, and the like). Every processor may not have a display, keyboard, mouse or the like associated with it.

As is known in the art, part or all of one or more aspects of the methods and apparatus discussed herein may be distributed as an article of manufacture that itself includes a tangible computer readable recordable storage medium having computer readable code means embodied thereon. The computer readable program code means is operable, in conjunction with a computer system (including, for example, system 700 or the like), to carry out all or some of the steps to perform the methods or create the apparatuses discussed herein. A computer readable medium may, in general, be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk. The medium can be distributed on multiple physical devices (or over multiple networks). As used herein, a tangible computer-readable recordable storage medium is defined to encompass a recordable medium, examples of which are set forth above, but is defined not to encompass a transmission medium or disembodied signal.

The computer systems and servers and other pertinent elements described herein each typically contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Accordingly, it will be appreciated that one or more embodiments of the present invention can include a computer program product comprising computer program code means adapted to perform one or all of the steps of any methods or claims set forth herein when such program is run, for example, on the rules engine 1028; a virtualized or non-virtualized hardware server implementing the rules engine 1028 or the like, and that such program may be embodied on a tangible computer readable recordable storage medium. A program can also run on a processor 306 of CPE 106. As used herein, including the claims, unless it is unambiguously apparent from the context that only server software is being referred to, a "server" includes a physical data processing system (for example, system 700 as shown in FIG. 7) running one or more server programs. It will be understood that such a physical server may or may not include a display, keyboard, or other input/output components. Furthermore, as used herein, including the claims, a "router" includes a networking device with both software and hardware tailored to the tasks of routing and forwarding information.

Furthermore, it should be noted that any of the methods described herein can include an additional step of providing a system comprising distinct software modules embodied on one or more tangible computer readable storage media. All the modules (or any subset thereof) can be on the same medium, or each can be on a different medium, for example. The modules can include any or all of the components shown in the figures. The method steps can then be carried out using the distinct software modules of the system, as described above, executing on one or more hardware processors (e.g., one or more hardware processors of the rules engine 1028; a DPI device; and/or other depicted components). Further, a computer program product can include a tangible computer-readable recordable storage medium with code adapted to be executed to carry out one or more method steps described herein, including the provision of the system with the distinct software modules.

Accordingly, it will be appreciated that one or more embodiments of the invention can include a computer program including computer program code means adapted to perform one or all of the steps of any methods or claims set forth herein when such program is implemented on a processor, and that such program may be embodied on a tangible computer readable recordable storage medium. Further, one or more embodiments of the present invention can include a processor including code adapted to cause the processor to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:
1. A method comprising:
with at least one processor in a network, obtaining information regarding network traffic flows, the obtained information comprising traffic pattern information and packet destination information;
with the at least one processor in the network, generating a classification model based on the obtained traffic pattern information and packet destination information, the classification model comprising one or more classification rules for classifying network traffic as normal or anomalous, wherein the traffic pattern information used to generate the one or more classification rules of the classification model comprises atypical volumes of data to destinations outside of a given geographic area of a computer;

with the at least one processor in the network, classifying the network traffic as anomalous or normal based on the generated classification model; and with the at least one processor in the network, initiating at least one mitigation action based on the network traffic being classified as anomalous.

2. The method of claim 1, wherein the packet destination information used to generate the one or more classification rules of the classification model identifies an Internet Protocol (IP) address on an atypical port.

3. The method of claim 1, wherein the traffic pattern information used to generate the one or more classification rules of the classification model identifies one or more atypical Transmission Control Protocol (TCP) flags.

4. The method of claim 1, wherein the packet destination information used to generate the one or more classification rules of the classification model identifies one or more Internet Protocol (IP) addresses that are not in a list of a top 1 million addresses and identifies a Domain Name Server (DNS) server for looking up a domain name, the domain name being excluded from the list of the top 1 million list of domain names.

* * * * *